United States Patent
Miyabe et al.

(10) Patent No.: US 11,830,342 B2
(45) Date of Patent: Nov. 28, 2023

(54) CONTROL METHOD AND CONTROL DEVICE FOR NOTIFICATION SYSTEM

(71) Applicant: Panasonic Intellectual Property Corporation of America, Torrance, CA (US)

(72) Inventors: Yoshiyuki Miyabe, Tokyo (JP); Mikiko Matsuo, Nara (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 17/692,535

(22) Filed: Mar. 11, 2022

(65) Prior Publication Data

US 2022/0198908 A1 Jun. 23, 2022

Related U.S. Application Data

(63) Continuation of application No. PCT/JP2021/016162, filed on Apr. 21, 2021.

(30) Foreign Application Priority Data

Jun. 3, 2020 (JP) .................................. 2020-096975

(51) Int. Cl.
G08B 21/02 (2006.01)
G08B 21/22 (2006.01)

(52) U.S. Cl.
CPC .................................. G08B 21/22 (2013.01)

(58) Field of Classification Search
USPC ............ 340/573.1, 568.1, 568.8, 613, 691.6, 340/686.6, 5.2, 5.32, 5.82, 5.91
See application file for complete search history.

(56) References Cited

U.S. PATENT DOCUMENTS

| 9,958,291 | B1* | 5/2018 | Shunturov | G01D 4/002 |
| 2015/0145993 | A1* | 5/2015 | Scalisi | H04M 11/025 |
| | | | | 348/143 |
| 2016/0292493 | A1* | 10/2016 | Gao | G06V 40/173 |
| 2017/0278146 | A1* | 9/2017 | Sumida | G06V 10/763 |
| 2019/0315003 | A1* | 10/2019 | Iwanami | B25J 11/008 |
| 2020/0322579 | A1* | 10/2020 | Iijima | H04L 12/282 |
| 2022/0157101 | A1* | 5/2022 | Wechsler | G06Q 10/0832 |

FOREIGN PATENT DOCUMENTS

| JP | 2015-162750 | 9/2015 |
| JP | 2017-174346 | 9/2017 |
| JP | 6321995 | 5/2018 |
| WO | 2019/131729 | 7/2019 |

OTHER PUBLICATIONS

International Search Report (ISR) dated Jul. 13, 2021 in International (PCT) Application No. PCT/JP2021/016162.

* cited by examiner

*Primary Examiner* — Daniel Previl
(74) *Attorney, Agent, or Firm* — Wenderoth, Lind & Ponack, L.L.P.

(57) ABSTRACT

A control method for a notification system including a notification device located in a facility, the control method including: detecting a visitor to the facility based on detection information from a first sensor; obtaining a current relationship between a first user and a second user present in the facility; and when a visitor to the first user is detected in the facility, notifying the second user of a visit by the visitor by using the notification device based on the current relationship.

6 Claims, 36 Drawing Sheets

FIG. 3

| Visited person | Type | Visitor | Planned visit date/time | Information for identification |
|---|---|---|---|---|
| User A | Delivery | Delivery-person A | January 10, 2020 2:00 - 4:00 PM | Deliveryperson information (face photo, QR code, etc.) Item information |
| User A | Visit | Visitor A | January 11, 2020 PM | Face information |
| User B | Visit | Visitor B | January 11, 2020 2:00 - 3:00 PM | Face information |
| ... | ... | ... | ... | ... |

|  | User A | User B | User C |
|---|---|---|---|
| User A |  | Poor | Good |
| User B | Poor |  | Good |
| User C | Good | Good |  |

Updated January 10, 2020 12:00 PM

|        | User A | User B | User C |
|--------|--------|--------|--------|
| User A |        | Yes    | No     |
| User B | No     |        | No     |
| User C | No     | Yes    |        |

| Visited person | Place | Acceptance | Priority order 1 | Priority order 2 |
|---|---|---|---|---|
| User A | First space | Not possible | User B | User C |
| User B | First space | Possible | User C | User A |
| User C | Second space | Possible | User A | User B |

FIG. 16A

Order information 501

| Order ID | User ID | Product ID | Qty. | Address |
|---|---|---|---|---|
| A001 | B001 | C001 | 1 | XXXX |

FIG. 16B

Delivery request information 502

| Reception ID | User ID | Product ID | Qty. | Address |
|---|---|---|---|---|
| D001 | B001 | C001 | 1 | XXXX |

FIG. 16C

Reception information 503

| Reception ID | Order ID | User ID | Product ID | Qty. |
|---|---|---|---|---|
| D001 | A001 | B001 | C001 | 1 |

FIG. 16D

Delivery contact information 504

| Reception ID | Delivery business ID | Planned delivery date/time | Deliveryperson face information |
|---|---|---|---|
| D001 | E001 | 2018/10/30 11:00 | XXXX |

FIG. 16E

Delivery status information 505

| Reception ID | Order ID | User ID | Product ID | Qty. | Delivery business ID | Planned delivery date/time | Delivery-person face information | Status |
|---|---|---|---|---|---|---|---|---|
| D001 | A001 | B001 | C001 | 1 | E001 | 2018/10/30 11:00 | XXXX | Unvisited |
| D002 | A002 | B001 | C002 | 2 | E002 | 2018/10/30 13:00 | XXXX | Unvisited |
| D003 | A003 | B001 | C003 | 1 | E001 | 2018/10/25 10:00 | XXXX | Visited |

CONTROL METHOD AND CONTROL DEVICE FOR NOTIFICATION SYSTEM

CROSS REFERENCE TO RELATED APPLICATIONS

This is a continuation application of PCT International Application No. PCT/JP2021/016162 filed on Apr. 21, 2021, designating the United States of America, which is based on and claims priority of Japanese Patent Application No. 2020-096975 filed on Jun. 3, 2020. The entire disclosures of the above-identified applications, including the specifications, drawings and claims are incorporated herein by reference in their entirety.

FIELD

The present disclosure relates to a control method and a control device for a notification system that notifies a user of a visit by a visitor to a facility when the visitor is detected.

BACKGROUND

There are past techniques which display images captured by a camera installed at an entrance/exit of a facility in a display terminal within the facility. For example, in the intercom system disclosed in PTL 1 (Japanese Patent No. 6321995), to improve security against people impersonating a deliveryperson of a delivery business, the deliveryperson is verified by a server of the delivery business, and an electronic visit list is displayed in a monitor installed within a facility.

SUMMARY

Technical Problem

However, with this past technique, a notification that a deliveryperson (a visitor) visits the facility is made regardless of the state of users within the facility, which may result in inappropriate users being notified.

Accordingly, the present disclosure provides a control method and the like for a notification system that can notify an appropriate user of a visit by a visitor to a facility when the visitor is detected.

Solution to Problem

A control method for a notification system according to one aspect of the present disclosure is a control method for a notification system including a notification device located in a facility. The control method includes: detecting a visitor to the facility based on detection information from a first sensor; obtaining a current relationship between a first user and a second user present in the facility; and when a visitor to the first user is detected in the facility, notifying the second user of a visit by the visitor by using the notification device based on the current relationship.

Note that these comprehensive or specific aspects may be realized by a system, a device, an integrated circuit, a computer program, or a computer-readable recording medium such as a CD-ROM, or may be implemented by any desired combination of systems, devices, integrated circuits, computer programs, and recording media.

Further benefits and advantages provided by the disclosed embodiments will become apparent from the specification and drawings. These benefits and advantages may be achieved individually by various embodiments, features of the specification and drawings, and the like, and not all of them need necessarily be provided to achieve one or more of the benefits and advantages.

Advantageous Effects

A control method for a notification system according to one aspect of the present disclosure can notify an appropriate user of a visit by a visitor to a facility when the visitor is detected.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 illustrates an example of planned visit information according to Embodiment 1.

FIG. 4 illustrates an example of relationship information according to Embodiment 1.

FIG. 6 illustrates an example of relationship information according to Variation 1 on Embodiment 1.

FIG. 8 illustrates an example of relationship information according to Variation 2 on Embodiment 1.

FIG. 16A illustrates an example of order information according to Embodiment 2.

FIG. 16B illustrates an example of delivery request information according to Embodiment 2.

FIG. 16C illustrates an example of reception information according to Embodiment 2.

FIG. 16D illustrates an example of delivery contact information according to Embodiment 2.

FIG. 16E illustrates an example of delivery status information according to Embodiment 2.

DESCRIPTION OF EMBODIMENTS

Figure 1:
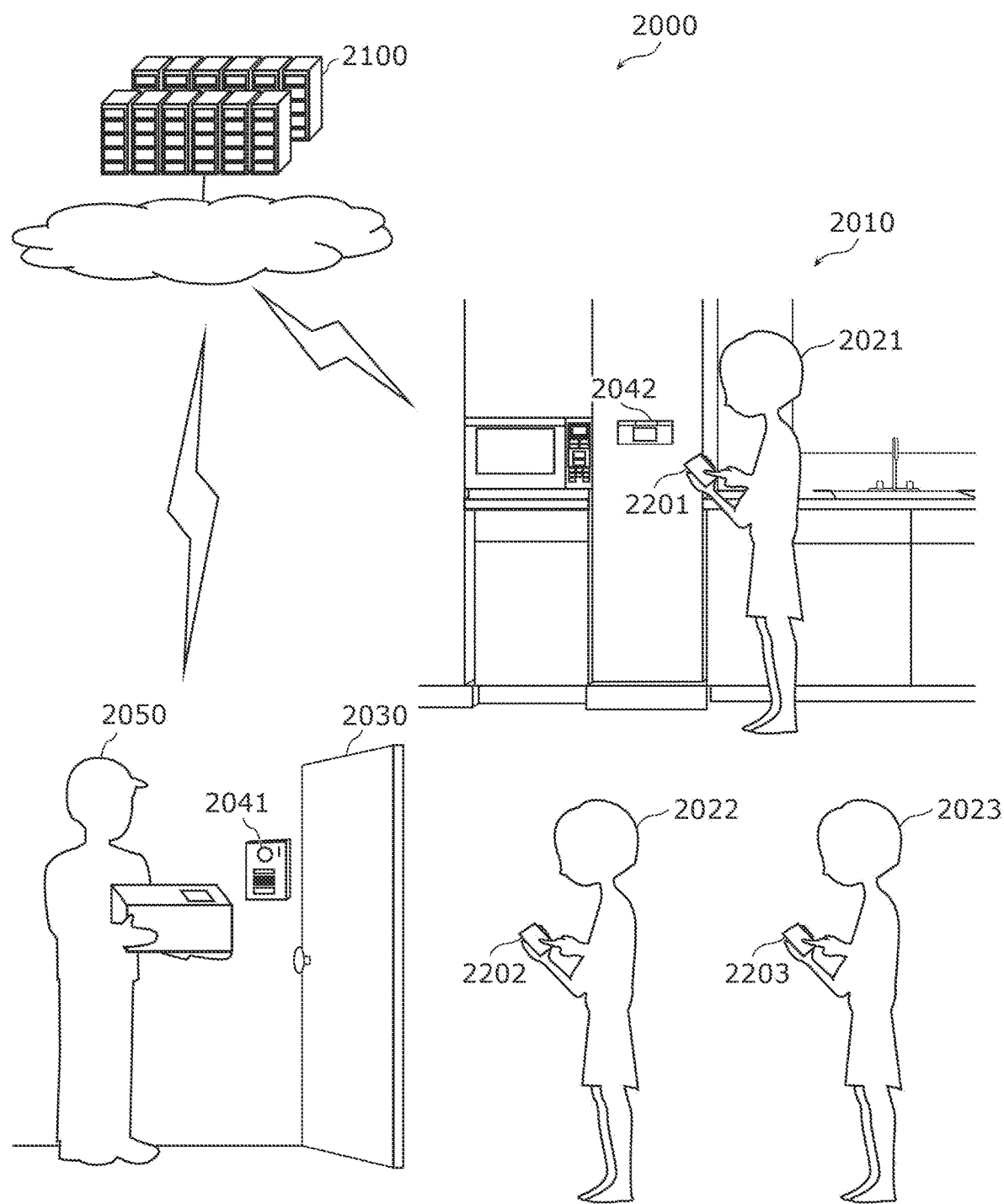
FIG. 1 illustrates a use case of a notification system according to Embodiment 1.

Embodiments will be described in detail hereinafter with reference to the drawings.

Note that the following embodiments describe comprehensive or specific examples of the present disclosure. The numerical values, shapes, materials, constituent elements, arrangements and connection states of constituent elements, steps, orders of steps, and the like in the following embodiments are merely examples, and are not intended to limit the scope of claims. Additionally, of the constituent elements in the following embodiments, constituent elements not denoted in the independent claims, which express the broadest interpretation, will be described as optional constituent elements. Additionally, the drawings are not necessarily exact illustrations. Configurations that are substantially the same are given the same reference signs in the drawings, and redundant descriptions will be omitted or simplified.

Embodiment 1

Notification System Use Case

First, a use case of notification system 2000 according to Embodiment 1 will be described with reference to FIG. 1. FIG. 1 illustrates a use case of notification system 2000 according to Embodiment 1.

In the present use case, notification system 2000 is used in facility 2010 in which users 2021 to 2023 are present. A residence can be given as an example of facility 2010, but facility 2010 is not limited thereto. For example, facility 2010 may be a condominium, a store, an office, or the like.

First sensor 2041 and second sensor 2042 are installed in facility 2010. First sensor 2041 is installed near entrance/exit 2030 of facility 2010 to detect visitor 2050 to facility 2010. Second sensor 2042 is installed within facility 2010 to detect users 2021 to 2023. For example, a camera and/or microphone, or an information terminal provided therewith (e.g., a smartphone) can be used as first sensor 2041 and second sensor 2042, but the sensors are not limited thereto.

Notification system 2000 includes control device 2100 and notification devices 2201 to 2203. Control device 2100 and notification devices 2201 to 2203 are communicably connected over a computer network (e.g., the Internet).

A cloud server or an edge server having a physical or virtual processor and memory can be used as control device 2100, but the device is not limited thereto. For example, an mobile terminal (e.g., a smartphone, a tablet computer, or the like) may be used as control device 2100.

Notification devices 2201 to 2203 notify users 2021 to 2023, respectively, of information. Mobile terminals can be used as notification devices 2201 to 2203, but the devices are not limited thereto. For example, walls or floors of facility 2010, displays installed in equipment or devices within facility 2010, or the like may be used as notification devices 2201 to 2203. In this case, each of notification devices 2201 to 2203 can notify a user present near the notification device of information. Note that notification devices 2201 to 2203 will be referred to as "notification device 2200" in the following when there is no need to distinguish among those devices.

Functional Configuration of Notification System

Figure 2:
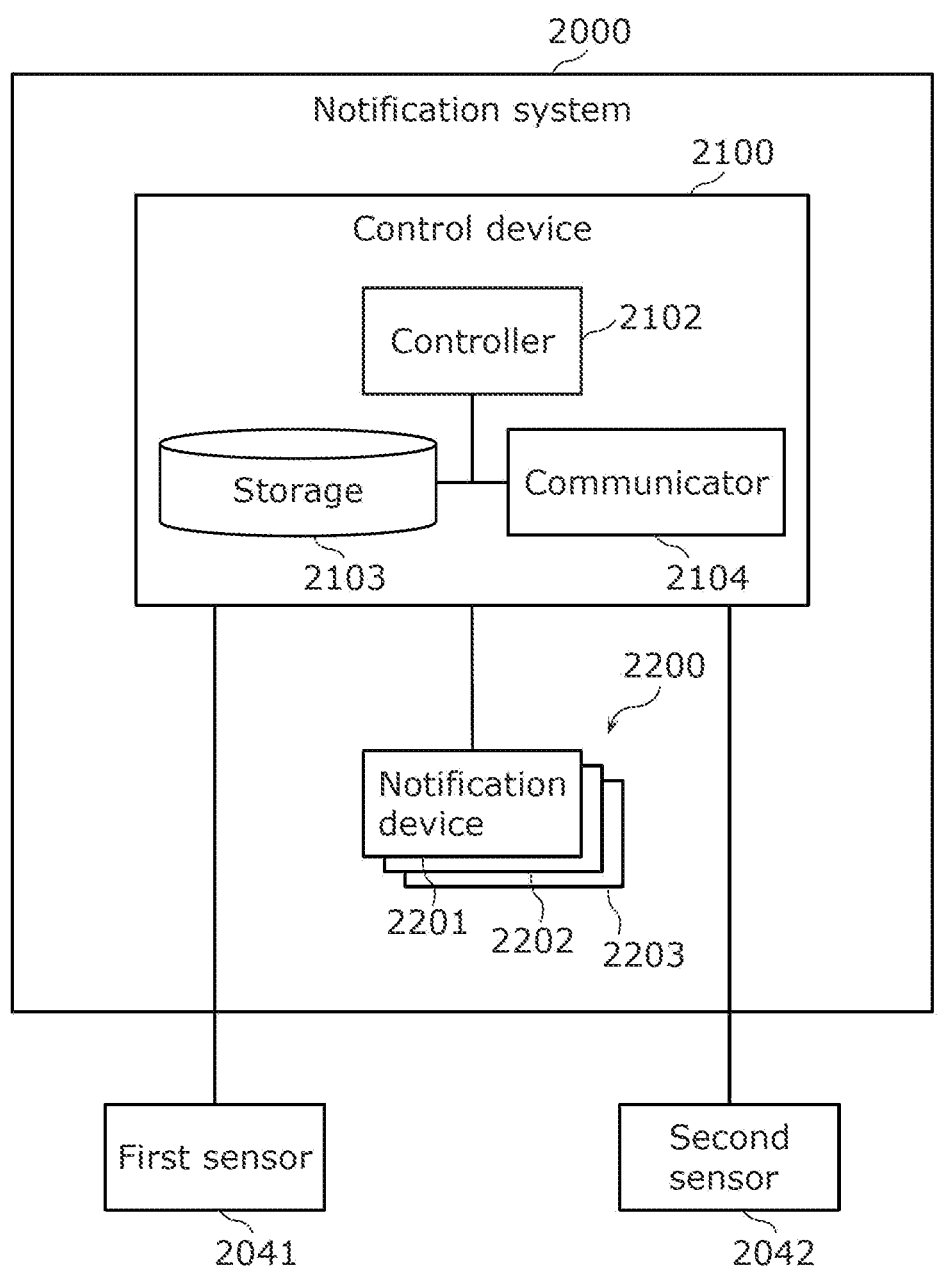
FIG. 2 is a block diagram illustrating the functional configuration of the notification system according to Embodiment 1.

The functional configuration of notification system 2000 will be described here with reference to FIG. 2. FIG. 2 is a block diagram illustrating the functional configuration of notification system 2000 according to Embodiment 1. Notification system 2000 is connected to first sensor 2041 and second sensor 2042, and includes control device 2100 and notification device 2200.

First sensor 2041 outputs detection information when visitor 2050 arrives at facility 2010. Specifically, if, for example, first sensor 2041 includes a camera, first sensor 2041 outputs a camera image of visitor 2050 as the detection information.

Second sensor 2042 detects users 2021 to 2023 within facility 2010. Specifically, if, for example, second sensor 2042 is a microphone, second sensor 2042 outputs audio information of users 2021 to 2023 as the detection information.

As illustrated in FIG. 2, control device 2100 includes controller 2102, storage 2103, and communicator 2104.

Storage 2103 is implemented as, for example, semiconductor memory and/or a hard disk drive. Storage 2103 stores planned visit information 2103a indicating planned visits of visitors, and relationship information 2103b indicating current relationships among users 2021 to 2023. Here, planned visit information 2103a and relationship information 2103b will be described in detail with reference to FIGS. 3 and 4.

FIG. 3 illustrates an example of planned visit information 2103a according to Embodiment 1. Planned visit information 2103a includes a visited person, a type, a visitor, a planned visit date/time, and information for identification. For example, FIG. 3 indicates that deliveryperson A plans to visit user A for a delivery between 2:00 PM and 4:00 PM on Jan. 10, 2020. FIG. 3 further indicates that deliveryperson A will be identified using deliveryperson information (a face image, a QR code (registered trademark), or the like) and item information.

Note that planned visit information 2103a in FIG. 3 is an example, and the planned visit information is not limited thereto. Some of the items included in planned visit information 2103a indicated in FIG. 3 may be omitted, and other items may be included.

FIG. 4 illustrates an example of relationship information 2103b according to Embodiment 1. Relationship information 2103b includes an update date/time, and indicates relationships between users A and B, users B and C, and users C and A. For example, FIG. 4 indicates that relationship information 2103b has been updated at 12:00 PM on Jan. 10, 2020, that the relationship between users A and B is poor, and the relationships between users B and C and between users C and A are good. Here, users A, B, and C represent users 2021 to 2023, respectively.

This relationship information 2103b may be set by a user manually, may be set by controller 2102 automatically, or a combination thereof.

For example, based on the detection information from second sensor 2042, controller 2102 may recognize a plurality of users and update relationship information 2103b for the plurality of users recognized. Specifically, controller 2102 may update relationship information 2103b based on a degree of similarity between conversation content of the plurality of users recognized and predetermined conversation content. Conversation content indicating that the relationship among the plurality of users is poor and/or conversation content indicating that the relationship among the plurality of users is good can be used as the predetermined conversation content. Note that controller 2102 may update relationship information 2103b from the conversation content using a machine learning model.

Additionally, for example, controller 2102 may update the relationship of the plurality of users recognized to poor if the detection information from second sensor 2042 satisfies a first condition. On the other hand, controller 2102 may update the relationship of the plurality of users recognized to good if the detection information from second sensor 2042 satisfies a second condition.

At this time, a sound pressure of voices of the plurality of users, indicated by the detection information from second sensor 2042, being at least a predetermined sound pressure can be used as the first condition. The predetermined sound pressure is a sound pressure for judging an argument among the plurality of users. Additionally, a first predetermined word being included in the voices of the plurality of users can be used as the first condition. The first predetermined word is a word for judging an argument among the plurality of users. Additionally, a predetermined action being included in user actions indicated by the detection information from second sensor 2042 can be used as the first condition. The predetermined action is an action for judging a fight among the plurality of users. Additionally, a voice condition and an action can be used in combination as the first condition. The predetermined sound pressure, the first predetermined word, and the predetermined action may be defined in advance empirically and/or experimentally, or may be set by a user manually.

Additionally, voices (a conversation) of the plurality of users, indicated by the detection information from second sensor 2042, continuing for at least a predetermined length of time can be used as the second condition. The predetermined length of time is a length of time for judging that a conversation among the plurality of users is long. Additionally, a second predetermined word being included in the voices of the plurality of users can be used as the second condition. The second predetermined word is a word for judging improved relations among the plurality of users. The predetermined length of time and the second predetermined word may be defined in advance empirically and/or experimentally, or may be set by a user manually.

Note that features of the plurality of users, registered in advance, can be used for the recognition of the plurality of users, but the recognition is not limited thereto. If an unknown user is recognized during the user recognition, the unknown user may be handled as all users, among the plurality of users registered in advance, who have not been recognized. For example, if users A, B, and C have been registered in advance, and user A and an unknown user are recognized from the detection information, the relationships among user A and all the other plurality of users registered in advance (users B and C) may be updated.

Controller 2102 is implemented by a processor and memory, for example. For example, the processor functions as controller 2102 when instructions or a software program stored in the memory are executed.

Controller 2102 detects visitor 2050 to facility 2010 based on the detection information from first sensor 2041. For example, controller 2102 receives a detection signal from first sensor 2041 via communicator 2104 and identifies the visitor and the visited person by referring to planned visit information 2103a. More specifically, for example, if first sensor 2041 includes a camera, controller 2102 receives a camera image of visitor 2050 from first sensor 2041. Controller 2102 then refers to planned visit information 2103a stored in storage 2103 and identifies the visitor and the visited person based on the current date/time and the camera image.

Additionally, controller 2102 obtains the current relationships among users 2021 to 2023 located within facility 2010. For example, controller 2102 refers to relationship information 2103b stored in storage 2103 and obtains the current relationships among users 2021 to 2023.

Then, when visitor 2050 for a first user in facility 2010 is detected, controller 2102 determines, based on the current relationships obtained, whether or not to notify a second user of the visit by visitor 2050 using notification device 2200. Controller 2102 transmits notification information to notification device 2200 according to the result of the determination. Here, the notification information functions as control information for controlling notification device 2200, and can cause notification device 2200 to notify the second user of the visit by visitor 2050.

For example, when visitor 2050 for user 2021 is detected, controller 2102 determines, based on the relationship between users 2021 and 2022, whether or not to notify user 2022 of the visit by visitor 2050 using notification device 2202. More specifically, when the current relationship between users 2021 and 2022 is indicated as being poor, controller 2102 determines not to notify user 2022 of the visit by visitor 2050, and does not transmit the notification information to notification device 2202. On the other hand, when the current relationship between users 2021 and 2022 is indicated as being good, controller 2102 determines to notify user 2022 of the visit by visitor 2050, and transmits the notification information to notification device 2202.

Communicator 2104 is implemented by, for example, a network adapter, and transmits and receives information to and from notification devices 2201 to 2203, first sensor 2041, and second sensor 2042.

Notification devices 2201 to 2203 can notify users 2021 to 2023, respectively, of information. Specifically, by displaying the notification information received from control device 2100, notification devices 2201 to 2203 can notify users 2021 to 2023 of the visit to facility 2010 by visitor 2050.

Although controller 2102 is included in control device 2100 in FIG. 2, it should be noted that controller 2102 need not be included in notification device 2200. In this case, notification device 2200 may obtain the current relationships of the first user and the second user located within facility 2010. Furthermore, when visitor 2050 for the first user in facility 2010 is detected, notification device 2200 may notify the second user of the visit by visitor 2050 based on the current relationships obtained.

Processing by Controller

Figure 5:
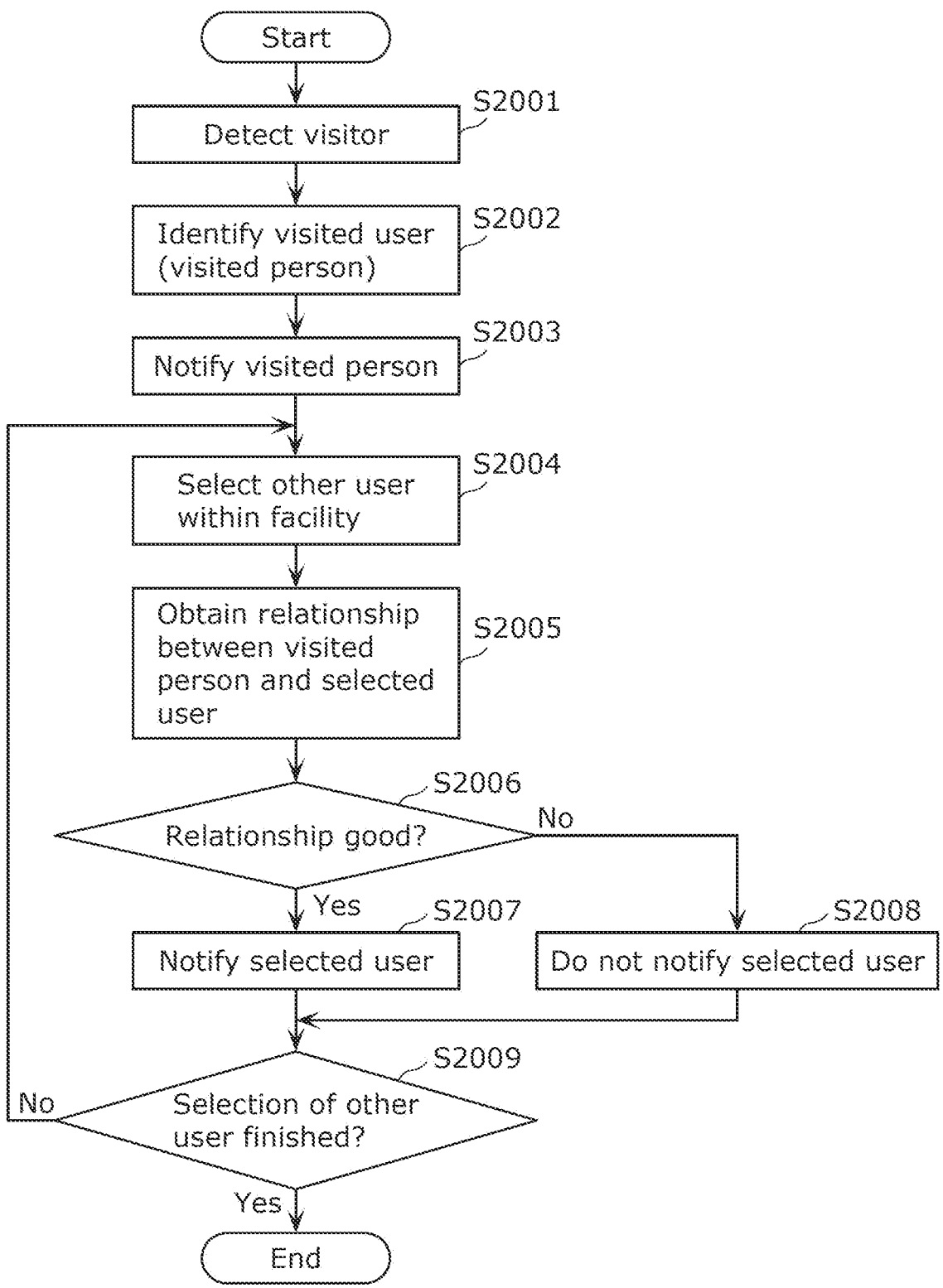
FIG. 5 is a flowchart illustrating processing by a controller according to Embodiment 1.

Processing by controller 2102 in notification system 2000 configured as described above will be described next with reference to FIG. 5. FIG. 5 is a flowchart illustrating the processing by controller 2102 according to Embodiment 1.

First, controller 2102 detects visitor 2050 to facility 2010 based on the detection information from first sensor 2041 (S2001). Furthermore, controller 2102 identifies the user being visited (the visited person) (S2002). Specifically, controller 2102 identifies visitor 2050 by, for example, verifying the camera image obtained from first sensor 2041 against face information included in planned visit information 2103a, and identifies the visited person corresponding to visitor 2050.

Controller 2102 transmits notification information to notification device 2200 of the visited person identified (S2003). The visited person is notified of the visit by visitor 2050 as a result.

Controller 2102 selects another user in facility 2010 (S2004). For example, if the visited person is user 2021, user 2022 or 2023 is selected. Controller 2102 then obtains the relationship between the visited person and the selected user (S2005). For example, if the visited person is user 2021 and the selected user is user 2022, controller 2102 obtains "poor" as the relationship between users 2021 and 2022 by referring to relationship information 2103b in FIG. 4.

Note that if the update date/time of relationship information 2103b is old, controller 2102 may refer to default relationship information. The default relationship information may be set in advance by a user, or may be information in which all relationships are set to good or poor. Whether or not the update date/time is old can be determined based on whether or not a difference between the current date/time and the update date/time is greater than a predetermined length of time. The predetermined length of time may be defined in advance empirically and/or experimentally, or may be set by a user manually.

Controller 2102 determines whether or not the relationship obtained is indicated as being good (S2006). Here, when the relationship is indicated as being good (Yes in S2006), controller 2102 determines to notify the selected user of the visit by visitor 2050, and transmits the notification information to notification device 2200 of the selected user (S2007). As a result, the selected user is notified by notification device 2200 of the visit by visitor 2050. Note that a notification device associated with the selected user in advance (e.g., a smartphone) can be used as notification device 2200 of the selected user. Additionally, a notification device located near the selected user (e.g., a display installed in a kitchen) may be used as notification device 2200 of the selected user. In this case, controller 2102 may obtain the location of the selected user in facility 2010 and transmit the notification information to notification device 2200 located near the stated location.

On the other hand, when the relationship is indicated as being poor (No in S2006), controller 2102 determines not to notify the selected user of the visit by visitor 2050, and does not transmit the notification information to notification device 2200 of the selected user (S2008). As a result, the selected user is not notified of the visit by visitor 2050.

Controller 2102 determines whether or not to end the selection of other users (S2009). For example, controller 2102 determines not to end the selection if an unselected user is present in the facility. Additionally, for example, controller 2102 may determine to end the selection if the selected user has already been notified of the visit by visitor 2050. The rule for this determination is not particularly limited.

If it is determined that the selection of other users is not to be ended (No in S2009), controller 2102 selects another unselected user (S2004) and repeats the subsequent processing. On the other hand, if it is determined that the selection of other users is to be ended (Yes in S2009), controller 2102 ends the processing.

Effects, etc.

As described thus far, a control method for notification system 2000 according to the present embodiment is a control method for notification system 2000 including notification device 2200 and controller 2102 located in facility 2010. The control method includes: detecting visitor 2050 to facility 2010 based on detection information from first sensor 2041; controller 2102 obtaining a current relationship between users 2021 and 2022 located in facility 2010; and when visitor 2050 to user 2021 is detected in facility 2010, notifying user 2022 of the visit by visitor 2050 using notification device 2202 based on the current relationship.

Through this, whether or not to notify user 2022 of the visit by visitor 2050 to user 2021 can be determined based on the current relationship between users 2021 and 2022. Accordingly, situations where a user having a relationship with user 2021 that is inappropriate for notification is notified of the visit by visitor 2050 to user 2021 can be suppressed.

Additionally, for example, in the control method for notification system 2000 according to the present embodiment, when determining whether or not to make a notification of the visit by visitor 2050, when the current relationship is poor, controller 2102 may determine not to notify user 2022 of the visit by visitor 2050 using notification device 2202.

Through this, when the current relationship between users 2021 and 2022 is poor, it can be determined not to notify user 2022 of the visit by visitor 2050 to user 2021. For example, the relationship between users 2021 and 2022 can be prevented from further deteriorating due to user 2022 being notified of the visit by visitor 2050 to user 2021 when user 2022 is fighting with user 2021.

Variation 1 on Embodiment 1

Variation 1 on Embodiment 1 will be described next. The present variation differs from the foregoing Embodiment 1 mainly in that whether or not another user is to be notified of a visit by a visitor is determined according to whether or not the user who is the visited person has an event planned for the other user (e.g., a birthday surprise). The present variation will be described hereinafter with reference to the drawings, focusing on points different from the foregoing Embodiment 1.

Note that the use case and functional configuration of the notification system according to the present variation are similar to those in the foregoing Embodiment 1, and thus the drawings and descriptions thereof will be simplified or omitted.

In the present variation, facility 2010 has a plurality of spaces demarked from each other. The plurality of spaces are demarked by, for example, walls and/or partitions, and may be referred to as "rooms".

Storage 2103 of control device 2100 stores relationship information 2103c instead of relationship information 2103b. FIG. 6 illustrates an example of relationship information 2103c according to Variation 1 on Embodiment 1.

Relationship information 2103c according to the present variation indicates whether or not users A to C have an event planned for another user. In FIG. 6, relationship information 2103c indicates that users A and C have an event planned for user B, and that nobody has an event planned for users A and C. This relationship information 2103c may be set by a user manually, may be set by controller 2102 automatically, or a combination thereof.

Figure 7:
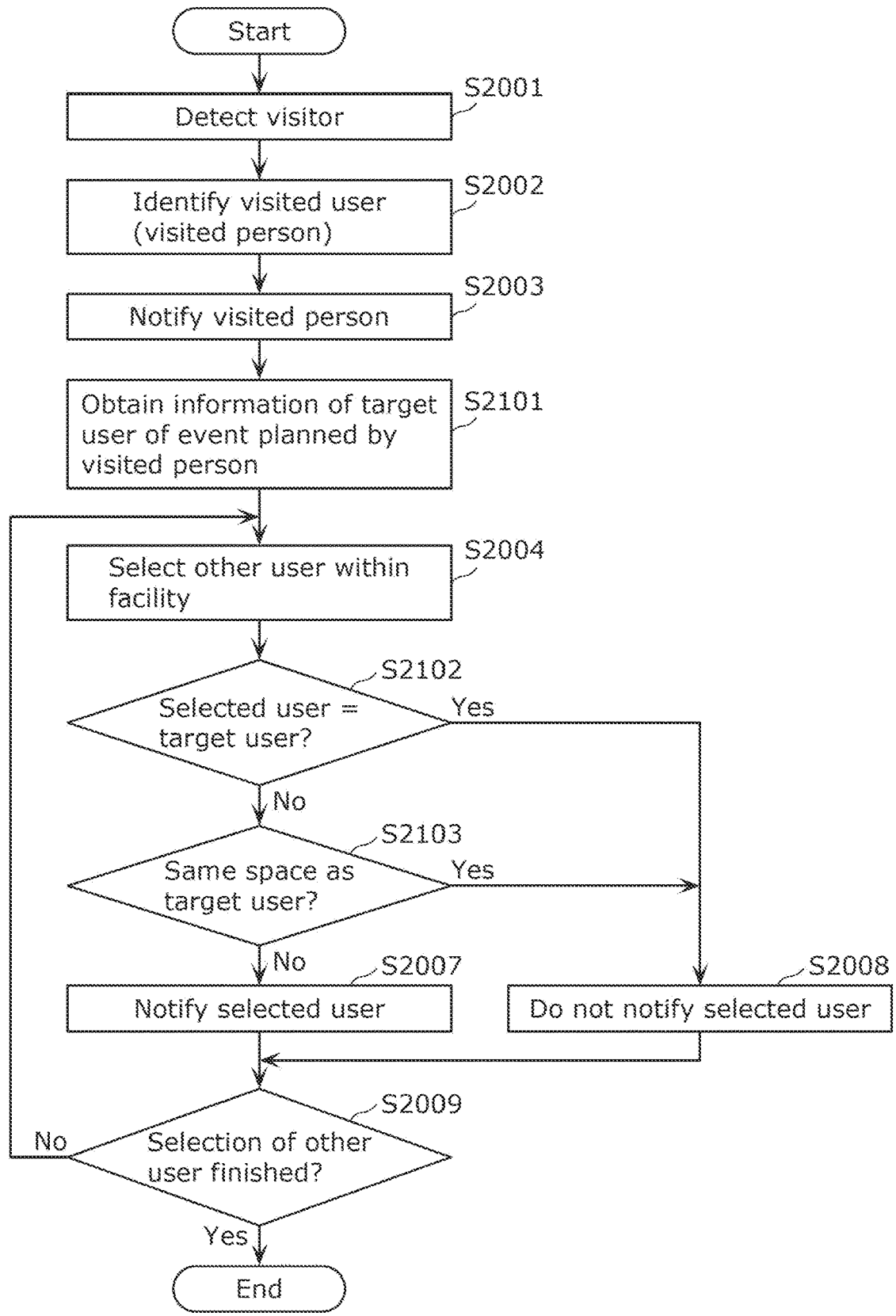
FIG. 7 is a flowchart illustrating processing by the controller according to Variation 1 on Embodiment 1.

Processing by controller 2102 in notification system 2000 according to the present variation will be described next with reference to FIG. 7. FIG. 7 is a flowchart illustrating processing by controller 2102 according to Variation 1 on Embodiment 1.

After performing step S2001 to step S2003 in the same manner as in FIG. 5, controller 2102 obtains information about a target user of an event being planned by the visited person (S2101). For example, if the visited person is user 2021 (user A), controller 2102 refers to relationship information 2103c in FIG. 6 and identifies user 2022 (user B) as the target user.

Controller 2102 selects another user in facility 2010 (S2004). Controller 2102 then determines whether or not the selected user and the target user match (S2102). In other words, controller 2102 determines whether or not the visited person has an event planned for the selected user.

Here, if the selected user and the target user match (Yes in S2102), controller 2102 determines not to notify the selected user of the visit by visitor 2050, and does not transmit the notification information to the notification device of the selected user (S2008). As a result, the selected user is not notified of the visit by visitor 2050. On the other hand, if the selected user and the target user do not match (No in S2102), controller 2102 determines whether or not the selected user is present in the same space as the target user in facility 2010 (S2103). Note that the locations of the selected user and the target user in facility 2010 are detected by second sensor 2042, for example.

Here, if the selected user and the target user are present in the same space (Yes in S2103), controller 2102 determines not to notify the selected user of the visit by visitor 2050, and does not transmit the notification information to the notification device of the selected user (S2008). As a result, the selected user is not notified of the visit by visitor 2050. O the other hand, if the selected user and the target user are present in different spaces (No in S2103), controller 2102 determines to notify the selected user of the visit by visitor 2050, and transmits the notification information to the notification device of the selected user (S2007). As a result, the selected user is notified, by the notification device of the selected user, of the visit by visitor 2050.

For example, according to relationship information 2103c in FIG. 6, user 2021 (user A) has an event planned for user 2022 (user B). As such, if the visited person is user 2021, user 2022 is not notified of the visit by visitor 2050, and user 2023, who is present in a different space from user 2022, is notified of the visit by visitor 2050.

As described thus far, in the control method for notification system 2000 according to the present variation, when determining whether or not to make a notification of the visit by visitor 2050, when the current relationship indicates that user 2021 has an event planned for user 2022, controller 2102 may determine not to notify user 2022 of the visit by visitor 2050 using notification device 2202.

Through this, when user 2021 has an event planned for user 2022, it can be determined not to notify user 2022 of the visit by visitor 2050 to user 2021. Accordingly, situations where a plan for an event for user 2022 is exposed to user 2022 can be suppressed. For example, if visitor 2050 is a deliveryperson delivering a birthday cake for user 2022, purchased by user 2021, situations where a plan for a birthday surprise for user 2022 is exposed to user 2022 by the deliveryperson or the delivered birthday cake can be suppressed.

Additionally, for example, in the control method for notification system 2000 according to the present variation, facility 2010 includes a plurality of spaces demarked from each other, and user 2022 is present in one of the plurality of spaces; and when determining whether or not to make a notification of the visit by visitor 2050, controller 2102 may determine not to notify user 2023 of the visit by visitor 2050 when user 2023 is present in the same space as user 2022 among the plurality of spaces, and may determine to notify user 2023 when user 2023 is present in a different space from user 2022 among the plurality of spaces.

Through this, it can be determined not to notify a user present in the same space as user 2022 of the visit by visitor 2050. Accordingly, situations where user 2022 discovers the visit by visitor 2050 can be suppressed. In other words, situations where a plan for an event for user 2022 is exposed to user 2022 can be better suppressed.

Although relationship information 2103c is used instead of relationship information 2103b in the present variation, it should be noted that both relationship information 2103b and 2103c may be used. For example, if the relationship between the visited person and the user is good and the visited person is not planning an event for the user, controller 2102 may determine to notify the user of the visit by visitor 2050. Conversely, if the relationship between the visited person and the user is poor and/or the visited person has an event planned for the user, controller 2102 may determine not to notify the user of the visit by visitor 2050.

Variation 2 on Embodiment 1

Variation 2 on Embodiment 1 will be described next. The present variation differs from the foregoing Embodiment 1 mainly in that another user is notified of a visit by a visitor in accordance with a priority order. The present variation will be described hereinafter with reference to the drawings, focusing on points different from the foregoing Embodiment 1.

Note that the use case and functional configuration of the notification system according to the present variation are similar to those in the foregoing Embodiment 1, and thus the drawings and descriptions thereof will be simplified or omitted.

Storage 2103 of control device 2100 stores relationship information 2103*d* instead of relationship information 2103*b*. FIG. 8 illustrates an example of relationship information 2103*d* according to Variation 2 on Embodiment 1.

Relationship information 2103*d* according to present variation indicates a priority order for other users among users A to C. This priority order indicates a level of the relationships between the user and other users. In FIG. 8, relationship information 2103*d* indicates that for user A, user B is higher in the priority order than user C. Additionally, relationship information 2103*d* indicates that for user B, user C is higher in the priority order than user A. Furthermore, relationship information 2103*d* indicates that for user C, user A is higher in the priority order than user B.

Additionally, relationship information 2103*d* includes information indicating locations where users A to C are present. FIG. 8 indicates that users A and B are present in a first space, and that user C is present in a second space. The locations where the users are present are, for example, detected by second sensor 2042 and updated by controller 2102.

Furthermore, relationship information 2103*d* includes information indicating whether or not it is possible for each of users A to C to accept an item from a visitor (a deliveryperson). In other words, relationship information 2103*d* includes information indicating whether or not users A to C can receive a visitor. Whether or not the item can be accepted is, for example, detected by second sensor 2042 and updated by controller 2102. For example, controller 2102 may update the information indicating whether or not the user can accept an item by recognizing behavior of the user based on a video shot by second sensor 2042. Specifically, controller 2102 may make an update indicating that the user cannot accept an item when the user is recognized as bathing, cooking, or sleeping. In FIG. 8, relationship information 2103*d* indicates that user A cannot accept an item, but that users B and C can accept an item.

Figure 9:
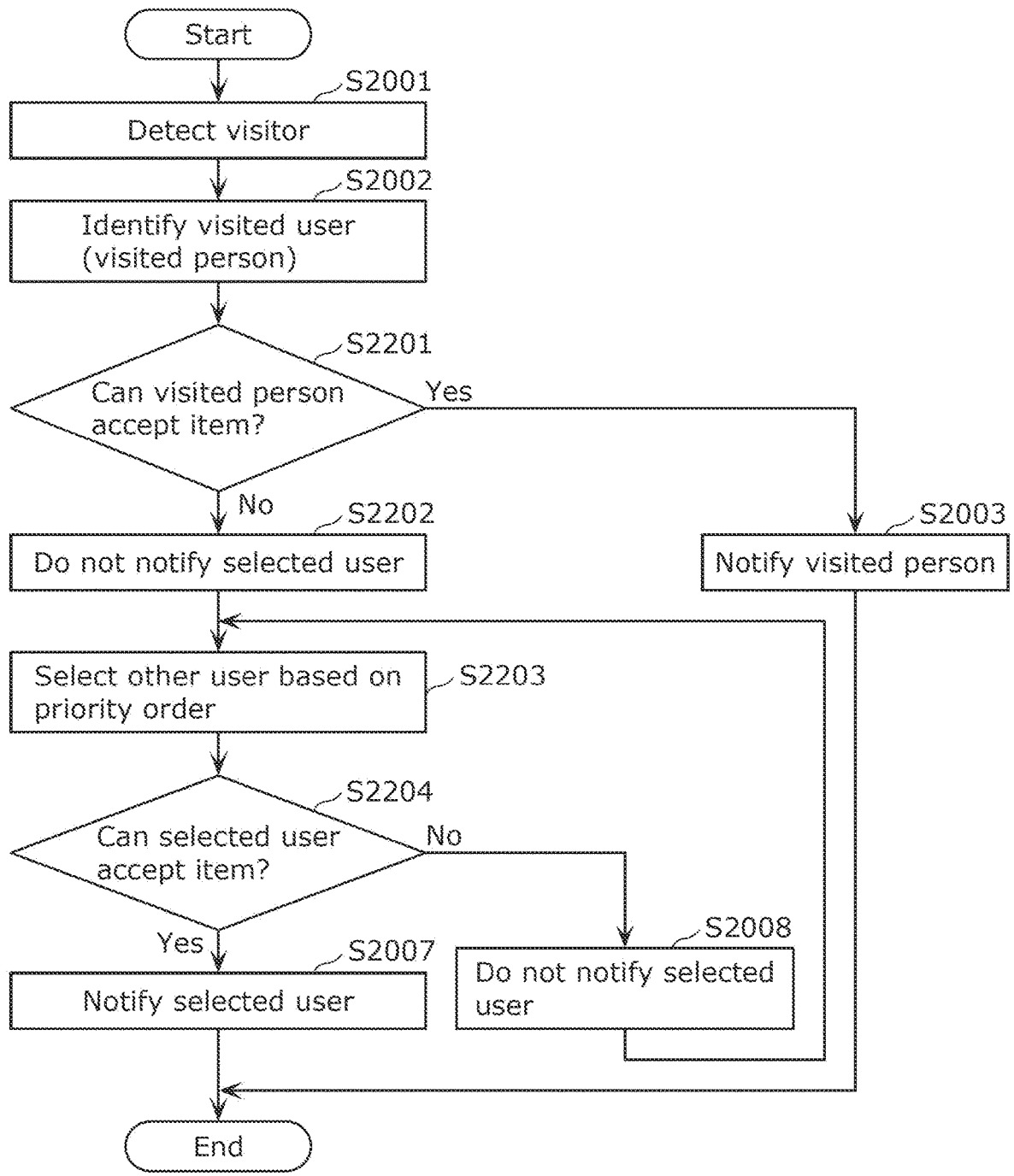
FIG. 9 is a flowchart illustrating processing by the controller according to Variation 2 on Embodiment 1.

Processing by controller 2102 in notification system 2000 according to the present variation will be described next with reference to FIG. 9. FIG. 9 is a flowchart illustrating processing by controller 2102 according to Variation 2 on Embodiment 1.

After performing step S2001 and step S2002 in the same manner as in FIG. 5, controller 2102 determines whether or not the visited person can accept an item (S2201). Here, if the visited person can accept an item (Yes in S2201), controller 2102 determines to notify the visited person of the visit by visitor 2050, transmits the notification information to notification device 2200 of the visited person (S2003), and ends the processing. As a result, the visited person is notified, by notification device 2200 of the visited person, of the visit by visitor 2050. For example, in FIG. 10, notification information 4100, which notifies user A, who is the visited person, of a visit by visitor A, is displayed by notification device 2201.

On the other hand, if the visited person cannot accept an item (No in S2201), controller 2102 determines not to notify the visited person of the visit by visitor 2050, and does not transmit the notification information to the notification device of the visited person (S2202).

Controller 2102 refers to relationship information 2103*d*, obtains the priority order of the other users for the visited person, and selects another user in accordance with the priority order (S2203). For example, when user A is the visited person, controller 2102 refers to relationship information 2103*d* in FIG. 8 and selects user B preferentially over user C.

Controller 2102 determines whether or not the selected user can accept an item (S2204). Here, if the selected user can accept an item (Yes in S2204), controller 2102 determines to notify the selected user of the visit by visitor 2050, transmits the notification information to notification device 2200 of the selected user (S2007), and ends the processing. As a result, the selected user is notified, by notification device 2200 of the selected user, of the visit by visitor 2050. For example, in FIG. 11, notification information which notifies user B of a visit by visitor A to user A is displayed by notification device 2202. The notification information includes image 4101 of visitor A (a deliveryperson), image 4102 of the item delivered, and delivery information 4103.

On the other hand, if the selected user cannot accept an item (No in S2204), controller 2102 determines not to notify the selected user of the visit by visitor 2050, does not transmit the notification information to the notification device of the selected user (S2008), and returns to step S2203. As a result, the selected user is not notified of the visit by visitor 2050.

Figure 10:
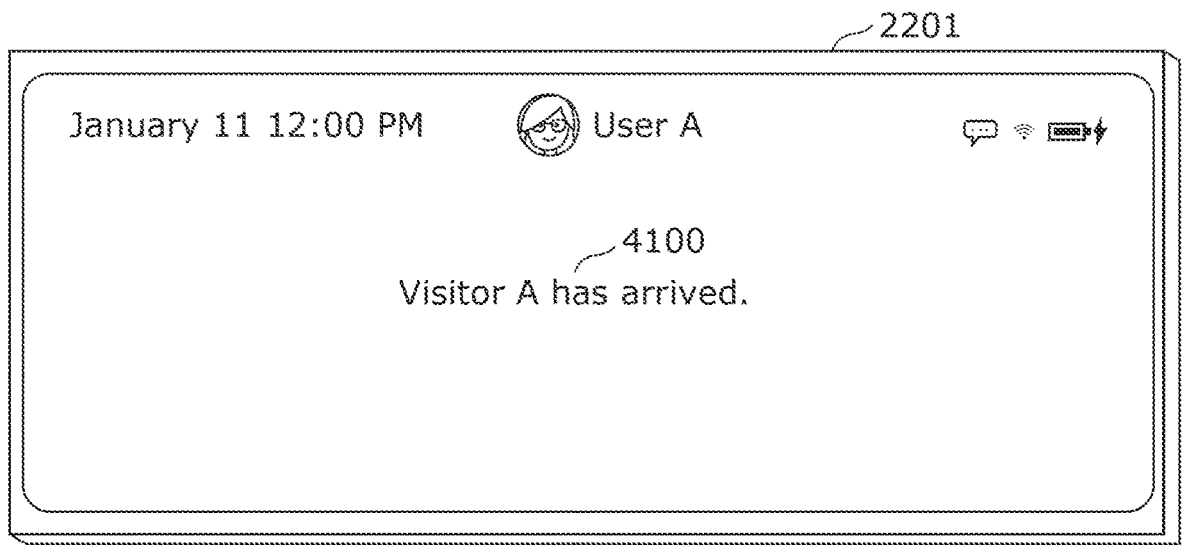
FIG. 10 illustrates an example of a display screen according to Variation 2 on Embodiment 1.
Figure 11:
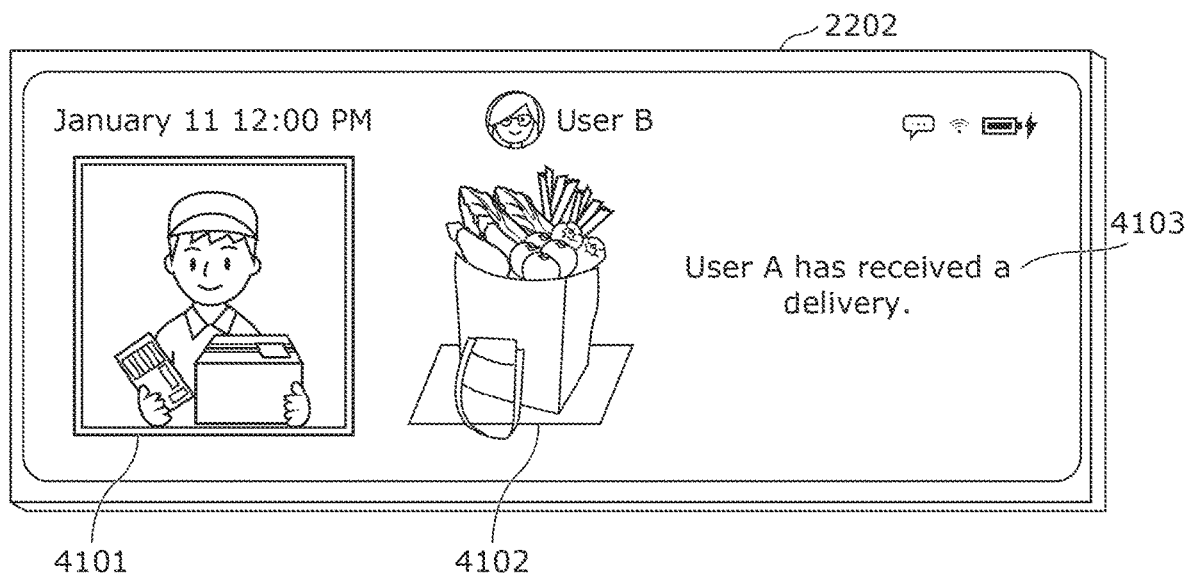
FIG. 11 illustrates an example of a display screen according to Variation 2 on Embodiment 1.
Figure 12:
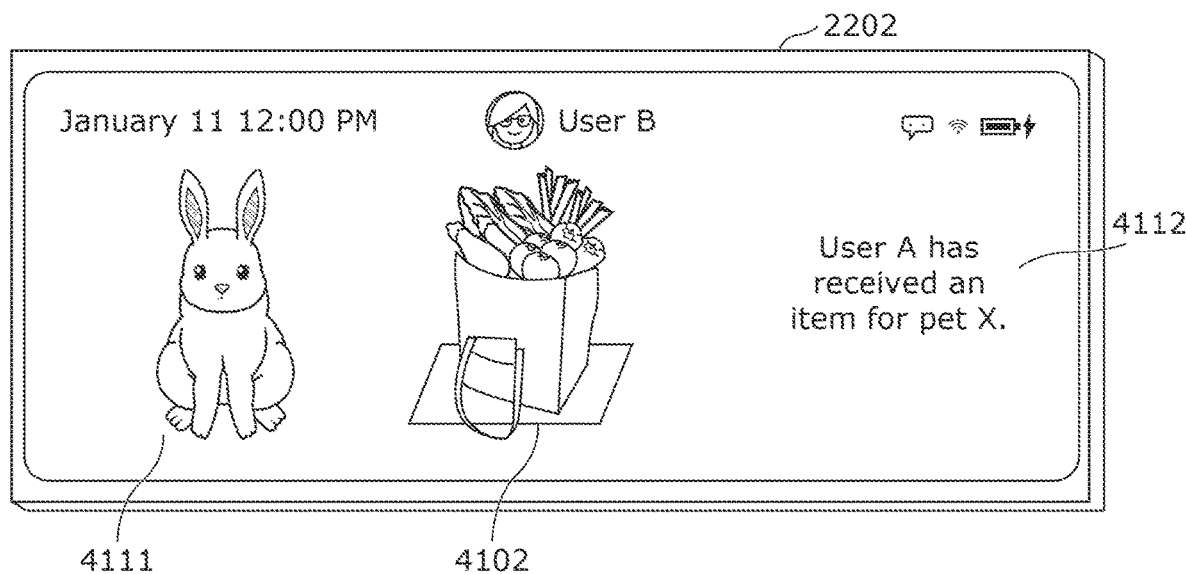
FIG. 12 illustrates an example of a display screen according to Variation 2 on Embodiment 1.

Note that the notification information displayed in the notification device illustrated in FIGS. 10 and 11 are examples, and the notification information is not limited thereto. For example, as illustrated in FIG. 12, an image related to the item may be displayed instead of the image of the visitor. In FIG. 12, delivery information 4112 indicating that an item for pet X has arrived at facility 2010 is displayed along with image 4111 of pet X as an image related to the item and image 4102 of the item. In other words, a notification of the visit by the deliveryperson and image information related to the item may be made by notification device 2200.

As described thus far, in the control method for notification system 2000 according to the present variation, user 2023 is present in facility 2010, and controller 2102: obtains information about whether or not user 2021 can receive visitor 2050 based on detection information from second sensor 2042; obtains a priority order indicating a level of the relationships between user 2021 and users 2022 and 2023 as the current relationship when user 2021 cannot receive visitor 2050; and notifies the users of visitor 2050 to facility 2010 using notification device 2200, in order from the user at a highest level in the priority order.

Through this, when user 2021 cannot receive visitor 2050, another user can be notified of the visit by visitor 2050 according to the priority order.

Additionally, for example, in the control method for notification system 2000 according to the present variation, visitor 2050 may be a deliveryperson delivering an item to facility 2010, and notification device 2200 may make a notification of the visit by the deliveryperson and image information pertaining to the item.

Through this, a notification of the visit by the deliveryperson and image information related to the item can be made.

Note that the present variation may be carried out in combination with Embodiment 1 and/or Variation 1 thereon.

Embodiment 2

Notification System Use Case

Figure 13:
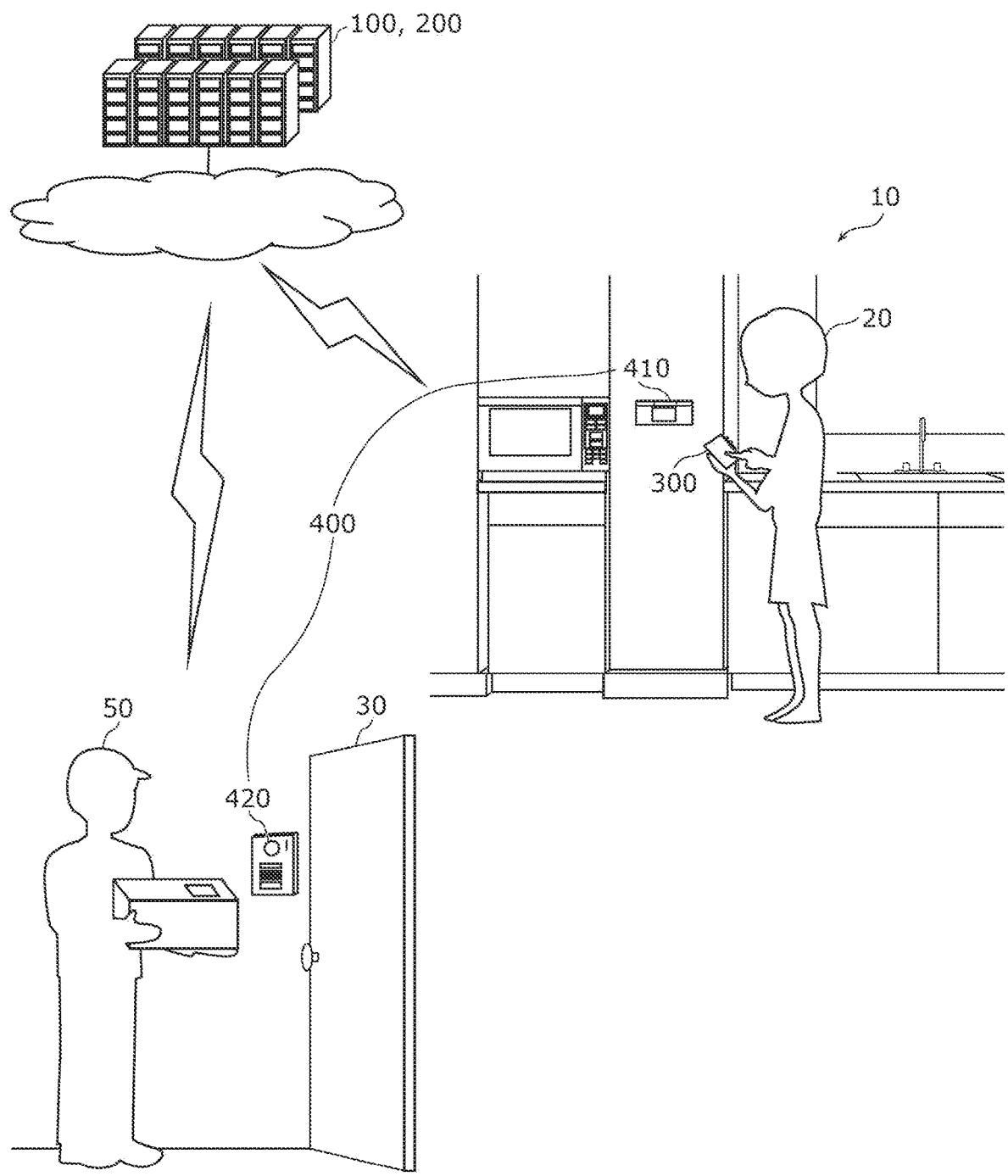
FIG. 13 illustrates a use case of a notification system according to Embodiment 2.

Next, a use case of notification system 400 according to Embodiment 2 will be described with reference to FIG. 13. FIG. 13 illustrates a use case of notification system 400 according to Embodiment 2.

Notification system 400 according to the present embodiment is used in facility 10, which is a residence of user 20. Note that facility 10 is not limited to a residence, and may be any building visited by a deliveryperson to deliver in item. For example, facility 10 may be a condominium, a store, an office, or the like.

In FIG. 13, notification system 400 includes notification device 410 and intercom device 420. Notification device 410 and intercom device 420 are communicably connected to each other.

Notification device 410 confirms whether or not visitor 50 is a deliveryperson, and notifies user 20 of delivery information according to the result of the confirmation. In other words, notification device 410 determines whether or not an image shot of visitor 50 satisfies a predetermined condition and makes a notification of the delivery information according to the result of the determination. Notification device 410 is located inside facility 10, and is, for example, fixed to a wall, a floor, or a ceiling of facility 10. Note that notification device 410 may be portable as well.

Intercom device 420 is installed outside facility 10, e.g., near entrance/exit 30 of facility 10. Intercom device 420 receives a visit by visitor 50 to facility 10, and shoots a face image of visitor 50. Intercom device 420 can be used for conversations with notification device 410 within facility 10.

Generally speaking, an intercom is a telephone used exclusively within buildings. Accordingly, "intercom device" may mean a device including equipment outside the building and equipment inside the building. However, in the present disclosure, "intercom device" is a term used mainly to refer to the equipment outside the building.

Ordering device 300 orders a product from a mail order company through electronic commerce. Ordering device 300 is used by user 20, and is, for example, a smartphone, a tablet computer, a laptop computer, a desktop computer, or any combination thereof.

Functional Configuration of Overall System Including Notification System

Figure 14:
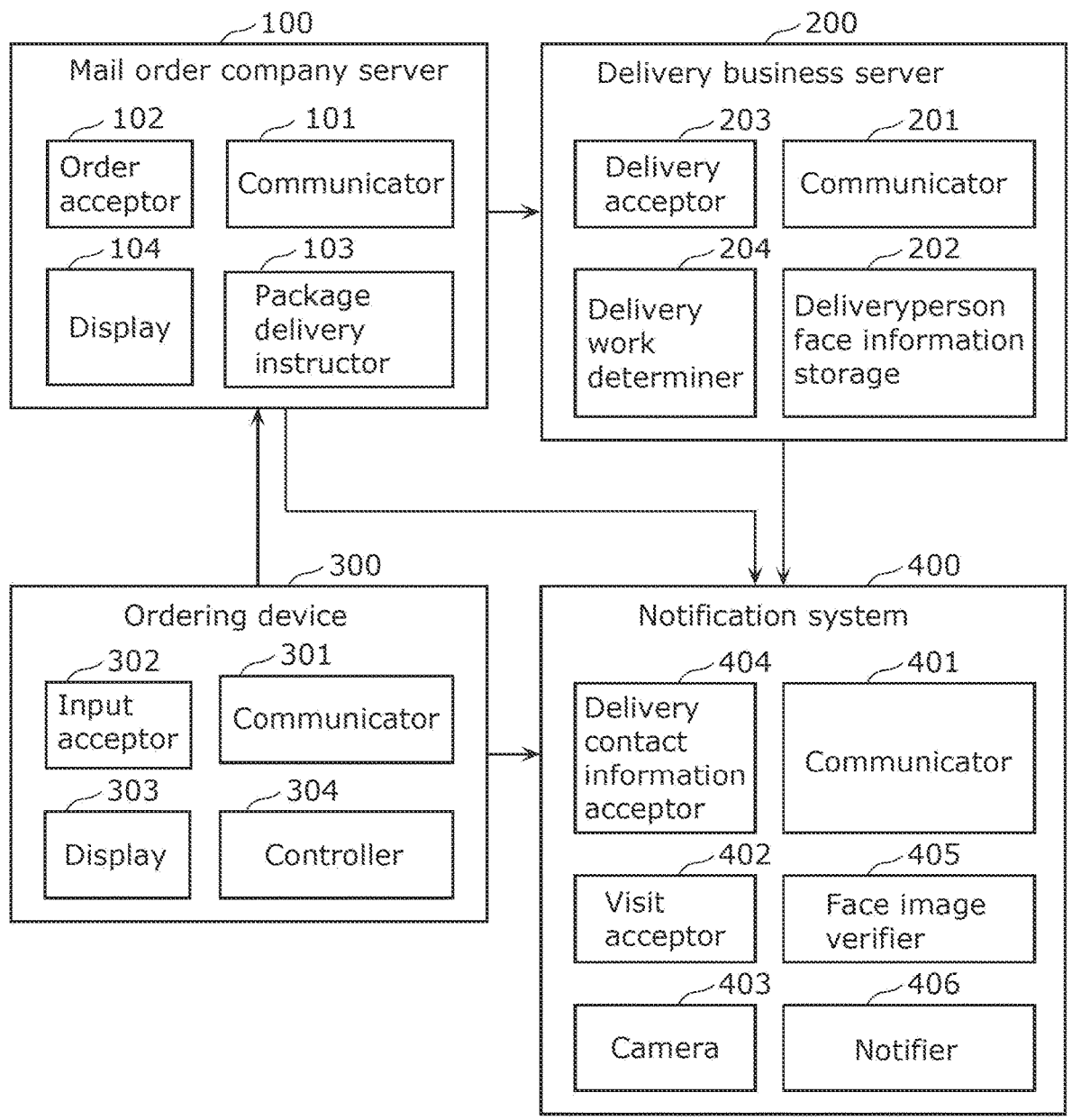
FIG. 14 is a block diagram illustrating the functional configuration of an overall system including the notification system according to Embodiment 2.
Figure 15:
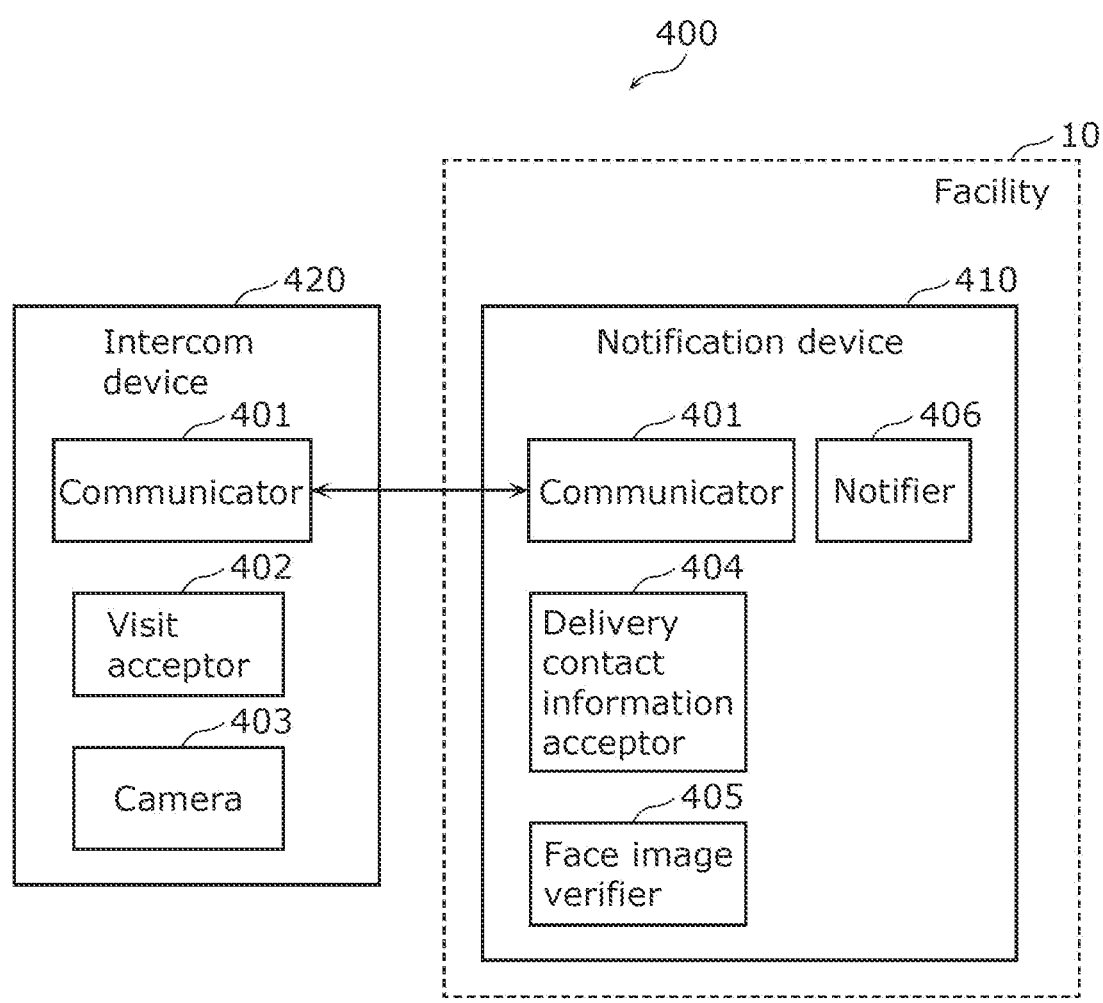
FIG. 15 is a block diagram illustrating the functional arrangement of the notification system according to Embodiment 2.

The functional configuration of an overall system including notification system 400, an external server, and the like will be described here with reference to FIGS. 14 to 16E. FIG. 14 is a block diagram illustrating the functional configuration of the overall system including notification system 400 according to Embodiment 2. FIG. 15 is a block diagram illustrating the functional configuration of notification system 400 according to Embodiment 2. FIGS. 16A to 16E illustrate an example of order information 501, delivery request information 502, reception information 503, delivery contact information 504, and delivery status information 505, respectively, according to Embodiment 2.

As illustrated in FIG. 14, mail order company server 100, delivery business server 200, and ordering device 300 are communicably connective to notification system 400.

Functional Configuration of Mail Order Company Server 100

First, the functional configuration of mail order company server 100 will be described with reference to FIGS. 14 and 16A to 16C. Mail order company server 100 is an example of an external server. As illustrated in FIG. 14, mail order company server 100 includes communicator 101, order acceptor 102, package delivery instructor 103, and display 104.

Communicator 101 is implemented by, for example, a wired and/or wireless communication circuit. Communicator 101 receives order information 501 from ordering device 300 over a communication network. For example, the Internet, a wide area network (WAN), a local area network (LAN), or any combination thereof can be used as the communication network.

As illustrated in FIG. 16A, order information 501 includes an order ID that identifies an order, a user ID that identifies the orderer, a product ID that identifies the product ordered, the quantity of the product ordered, and the address to which the ordered product is to be delivered. Note that order information 501 illustrated in FIG. 16A is an example, and the order information is not limited thereto. For example, order information 501 may further include a name of the product ordered.

Furthermore, communicator 101 transmits delivery request information 502 to delivery business server 200 over the communication network. As illustrated in FIG. 16B, delivery request information 502 includes a reception ID that identifies the acceptance (i.e., reception) of an order, a user ID that identifies the orderer, a product ID that identifies the product for which the order was received, the quantity of the product for which the order was received, and an address to which the product for which the order was received is to be delivered. Note that delivery request information 502 illustrated in FIG. 16B is an example, and the delivery request information is not limited thereto. For example, the quantity may be a quantity of boxes packed with products for delivery.

Additionally, communicator 101 transmits reception information 503 to notification system 400 over the communication network. As illustrated in FIG. 16C, reception information 503 includes a reception ID that identifies the reception of an order, an order ID that identifies the order, a user ID that identifies the orderer, a product ID that identifies the product for which the order was received, and the quantity of the product for which the order was received. Note that reception information 503 illustrated in FIG. 16C is an example, and the reception information is not limited thereto. For example, reception information 503 may further include a name of the product for which the order was received.

Order acceptor 102 is implemented by, for example, a processor and memory storing commands. Note, however, that order acceptor 102 may be implemented by a dedicated electronic circuit. Based on order information 501 received from ordering device 300, order acceptor 102 performs order reception processing, and generates delivery request information 502, reception information 503, and ordered product information.

The ordered product information is information pertaining to the product for which the order was received, and is transmitted to package delivery instructor 103. The ordered product information includes the product ID, the quantity, and the like in order information 501, for example.

Package delivery instructor 103 is implemented by, for example, a processor and memory storing commands. Note, however, that package delivery instructor 103 may be implemented by a dedicated electronic circuit. Package delivery instructor 103 generates packing instruction information based on the ordered product information received from order acceptor 102. The packing instruction information is information used by a worker in a product warehouse to prepare a product for shipping, and is transmitted to display 104. The packing instruction information includes the product ID, the quantity, the reception ID, and the like, for example.

Display 104 is implemented by, for example, a liquid crystal display and/or an organic EL display. Display 104 is installed in the product warehouse, and displays the packing instruction information. In the warehouse, the worker packages the product based on the packing instruction information displayed in display 104 and passes the packaged product to a delivery business in a state where the reception ID can be recognized.

Functional Configuration of Delivery Business Server 200

Next, the functional configuration of delivery business server 200 will be described with reference to FIGS. 14 and 16D. Delivery business server 200 is an example of an external server. As illustrated in FIG. 14, delivery business server 200 includes communicator 201, deliveryperson face information storage 202, delivery acceptor 203, and delivery work determiner 204.

Communicator 201 is implemented by, for example, a wired and/or wireless communication circuit. Communicator 201 receives delivery request information 502 from mail order company server 100 over the communication network. Furthermore, communicator 201 transmits delivery contact information 504 to notification system 400 over the communication network.

As illustrated in FIG. 16D, delivery contact information 504 includes a reception ID that identifies the reception of an order, a delivery business ID that identifies the delivery business, a planned delivery date/time, and deliveryperson face information indicating the face of the deliveryperson delivering the product. Note that delivery contact information 504 illustrated in FIG. 16D is an example, and the delivery contact information is not limited thereto. The deliveryperson face information may indicate the faces of a plurality of deliverypersons.

Deliveryperson face information storage 202 is implemented by, for example, a hard disk drive and/or semiconductor memory. Deliveryperson face information storage 202 stores the face information of a plurality of deliverypersons. The deliveryperson face information may be a face image of the deliveryperson, or may be a feature extracted from the face image.

Delivery acceptor 203 is implemented by, for example, a processor and memory storing commands. Note, however, that delivery acceptor 203 may be implemented by a dedicated electronic circuit. Delivery acceptor 203 generates delivery instruction information based on delivery request information 502 received from mail order company server 100. The delivery instruction information includes information for assigning a deliveryperson to a delivery request for a product, and is transmitted to delivery work determiner 204.

Furthermore, delivery acceptor 203 generates delivery contact information 504 based on the reception ID and deliveryperson face information received from delivery work determiner 204.

Delivery work determiner 204 is implemented by, for example, a processor and memory storing commands. Note, however, that delivery work determiner 204 may be implemented by a dedicated electronic circuit. Delivery work determiner 204 assigns a deliveryperson to the delivery request based on the delivery instruction information received from delivery acceptor 203, and obtains the face information of the assigned deliveryperson from deliveryperson face information storage 202. Delivery work determiner 204 transmits the obtained deliveryperson face information to delivery acceptor 203 along with the reception ID. Note that an operator may assign the deliveryperson. In this case, delivery work determiner 204 may present, to the operator, information for assigning the deliveryperson.

Functional Configuration of Ordering Device 300

The functional configuration of ordering device 300 will be described next with reference to FIG. 14. As illustrated in FIG. 14, ordering device 300 includes communicator 301, input acceptor 302, display 303, and controller 304.

Communicator 301 is implemented by, for example, a wired and/or wireless communication circuit. Communicator 301 transmits order information 501 from mail order company server 100 over the communication network. Communicator 301 may also transmit order information 501 to notification system 400.

Input acceptor 302 is an input device for accepting inputs from user 20. Input acceptor 302 is implemented as, for example, a touch panel provided integrally with a display (i.e., a touch screen). Input acceptor 302 may also be implemented by, for example, a keyboard and/or a mouse or the like. Input acceptor 302 accepts the input of information pertaining to a product from user 20.

Display 303 is implemented by, for example, a liquid crystal display and/or an organic EL display. Display 303 displays a screen including information necessary for ordering and the like based on the information accepted by input acceptor 302.

Controller 304 is implemented by, for example, a processor and memory storing commands. Note, however, that controller 304 may be implemented by a dedicated electronic circuit. Controller 304 performs ordering processing by controlling operations of communicator 301, input acceptor 302, and display 303.

Configuration of Notification System 400

The configuration of notification system 400 will be described next with reference to FIGS. 14, 15, and 16E. As illustrated in FIG. 15, notification system 400 includes notification device 410 and intercom device 420. Additionally, as illustrated in FIG. 14, notification system 400 includes, as functions, communicator 401, visit acceptor 402, camera 403, delivery contact information acceptor 404, face image verifier 405, and notifier 406. Each of the functional constituent elements of notification system 400 is provided in notification device 410 and/or intercom device 420.

Communicator 401 is provided in both notification device 410 and intercom device 420, and is implemented by, for example, a wired and/or wireless communication circuit. Communicator 401 receives reception information 503 from mail order company server 100 over the communication network. Furthermore, communicator 401 receives delivery contact information 504 from delivery business server 200 over the communication network.

Communicator 401 also communicates data between notification device 410 and intercom device 420. For example, communicator 401 transmits a camera image from intercom device 420 to notification device 410. Wired communication and/or wireless communication can be used as the data communication. Wireless LAN, Bluetooth (registered trademark), Zigbee (registered trademark), or any combination thereof can be used as the wireless communication.

Visit acceptor 402 is provided in intercom device 420, and is implemented by a call button or the like, for example. Visit acceptor 402 accepts a visit by visitor 50 to facility 10. Visit acceptor 402 may be linked to camera 403.

Camera 403 is provided in intercom device 420, and is realized by an image sensor, an optical lens, and the like, for example. Camera 403 shoots a face image of visitor 50 accepted by visit acceptor 402 by shooting an image outside facility 10. The image shot by camera 403 is called a "camera image". Camera 403 may be linked to visit acceptor 402.

Delivery contact information acceptor 404 is provided in notification device 410, and is implemented by, for example, a processor and memory storing commands. Note, however, that delivery contact information acceptor 404 may be implemented by a dedicated electronic circuit. Delivery contact information acceptor 404 associates delivery contact information 504 received from delivery business server 200 with reception information 503 received from mail order company server 100 and records the result as delivery status information 505.

As illustrated in FIG. 16E, delivery status information 505 includes the reception ID that identifies the reception of an order, the order ID identifying the order, the user ID identifying the orderer, the product ID identifying the product for which the order was received, the quantity of the product for which the order was received, the delivery business ID identifying the delivery business, the planned delivery date/time, the deliveryperson face information indicating the face of the deliveryperson delivering the product, and a status indicating whether the deliveryperson has or has not yet visited. Note that delivery status information 505 illustrated in FIG. 16E is an example, and the delivery status information is not limited thereto.

Furthermore, when a face image is shot by camera 403 when visit acceptor 402 has accepted a visit, delivery contact information acceptor 404 transmits the deliveryperson face information having an "unvisited" status in delivery status information 505 to face image verifier 405. Then, based on a verification result by face image verifier 405, delivery contact information acceptor 404 transmits the corresponding reception ID to notification device 410 and updates the status of the corresponding reception ID to "visited".

Face image verifier 405 is provided in notification device 410, and is implemented by, for example, a processor and memory storing commands. Note, however, that face image verifier 405 may be implemented by a dedicated electronic circuit. Face image verifier 405 verifies the face image shot by camera 403 (i.e., the camera image) against the deliveryperson face information received from delivery contact information acceptor 404. In other words, face image verifier 405 compares the face information with the camera image and confirms whether or not visitor 50 is a deliveryperson. Face image verifier 405 transmits the verification result to delivery contact information acceptor 404.

Notifier 406 is implemented by, for example, a display, a speaker, a microphone, a user interface (e.g., a touch panel), or any combination thereof. Notifier 406 makes a notification of delivery information, which indicates that a deliveryperson for an item has arrived at facility 10, when visitor 50 is confirmed as being a deliveryperson. In the present embodiment, notifier 406 displays the delivery information in a display (e.g., a liquid crystal display or an organic EL display). Note, however, that the notification method used by notifier 406 is not limited to a display. Notifier 406 may make the notification of the delivery information using, for example, sound and/or vibration. Notifier 406 may also make the notification of the delivery information using a combination of sound and/or vibration and a display.

Operations of Overall System Including Notification System 400

Operations of the overall system including the notification system configured as described above will be described next.

Interactions Among Devices

Figure 17:
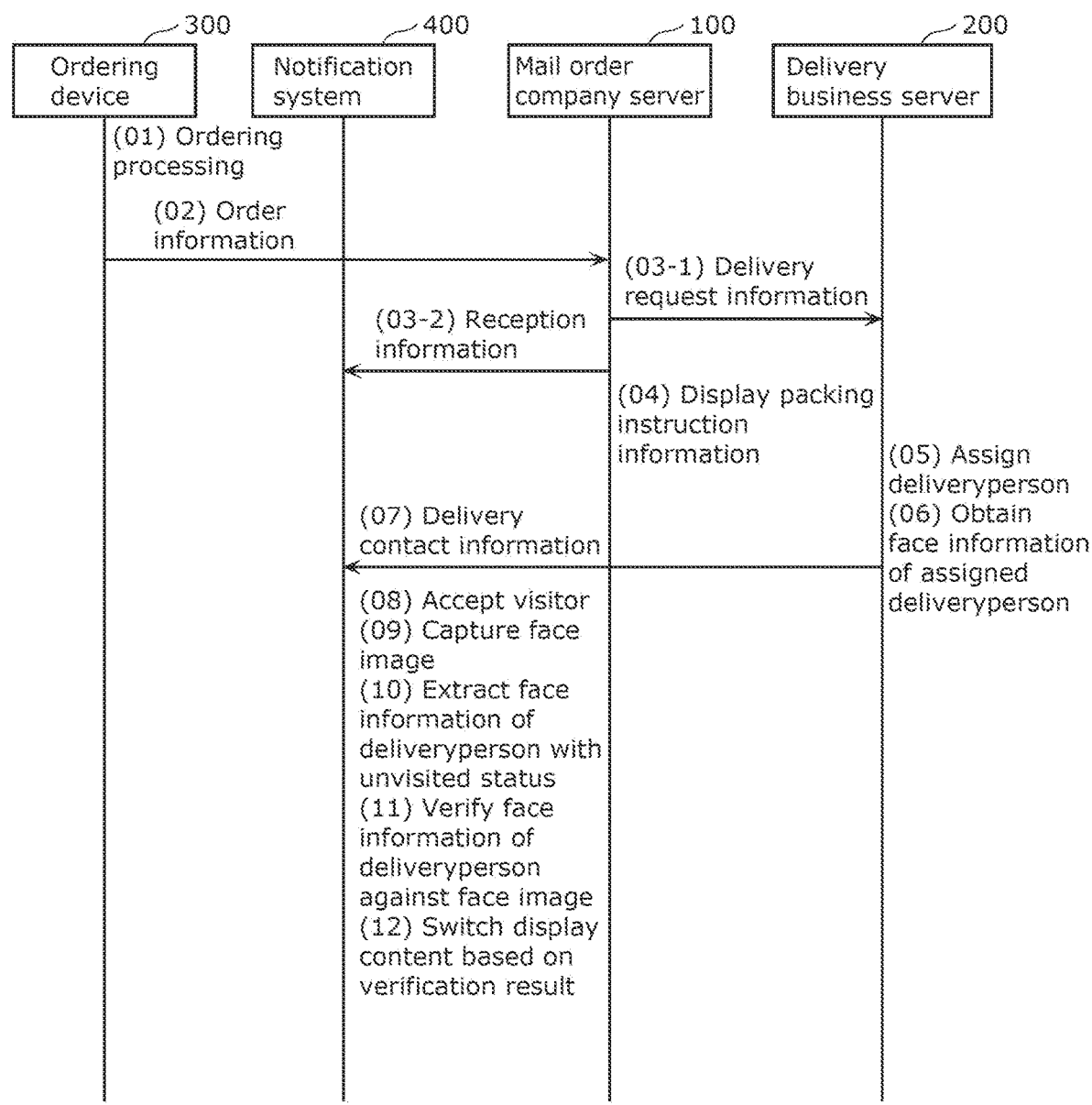
FIG. 17 is a sequence chart of the overall system including the notification system according to Embodiment 2.

First, interactions among mail order company server 100, delivery business server 200, ordering device 300, and notification system 400 will be described with reference to FIG. 17. FIG. 17 is a sequence chart of the overall system including notification system 400 according to Embodiment 2. In FIG. 17, the numbers in parentheses represent chronological order.

First, ordering device 300 performs the ordering processing (01). As a result, order information 501 is transmitted from ordering device 300 to mail order company server 100 (02).

Next, based on order information 501, mail order company server 100 transmits delivery request information 502 to delivery business server 200 (03-1) and transmits reception information 503 to notification system 400 (03-2). Furthermore, mail order company server 100 displays the packing instruction information (04).

Delivery business server 200 assigns a deliveryperson to the delivery request based on delivery request information 502 (05). Furthermore, delivery business server 200 obtains the face information of the assigned deliveryperson (06), and transmits delivery contact information 504 including the obtained face information to notification system 400 (07).

Here, when notification system 400 accepts visitor 50 (08), notification system 400 shoots a face image of visitor 50 (09). Then, notification system 400 extracts deliveryperson face information having the "unvisited" status from delivery status information 505 (10). Notification system 400 verifies the face image shot of visitor against the extracted deliveryperson face information (11). Notification system 400 then switches the display content based on the verification result (12).

Processing by Ordering Device 300

Figure 18:
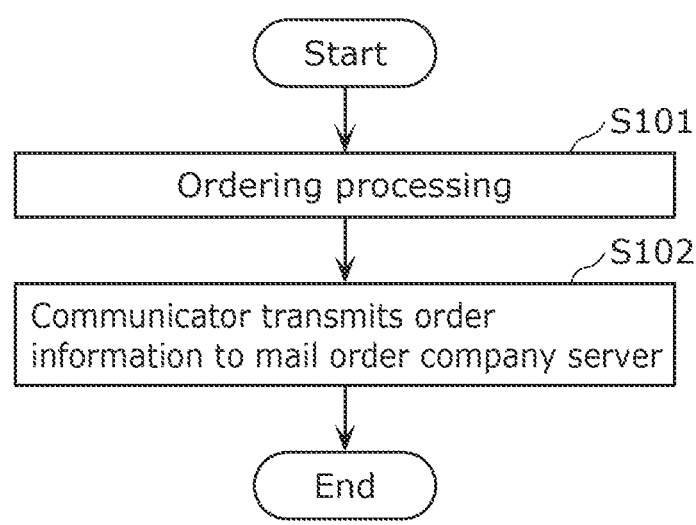
FIG. 18 is a flowchart illustrating processing by an ordering device according to Embodiment 2.

Processing by ordering device 300 will be described next with reference to FIG. 18. FIG. 18 is a flowchart illustrating processing by ordering device 300 according to Embodiment 2.

First, controller 304 performs the ordering processing (S101). Specifically, controller 304 generates order information 501 based on input from user 20, accepted by input acceptor 302. Communicator 301 transmits order information 501 to mail order company server 100 (S102).

Processing by Mail Order Company Server 100

Figure 19:
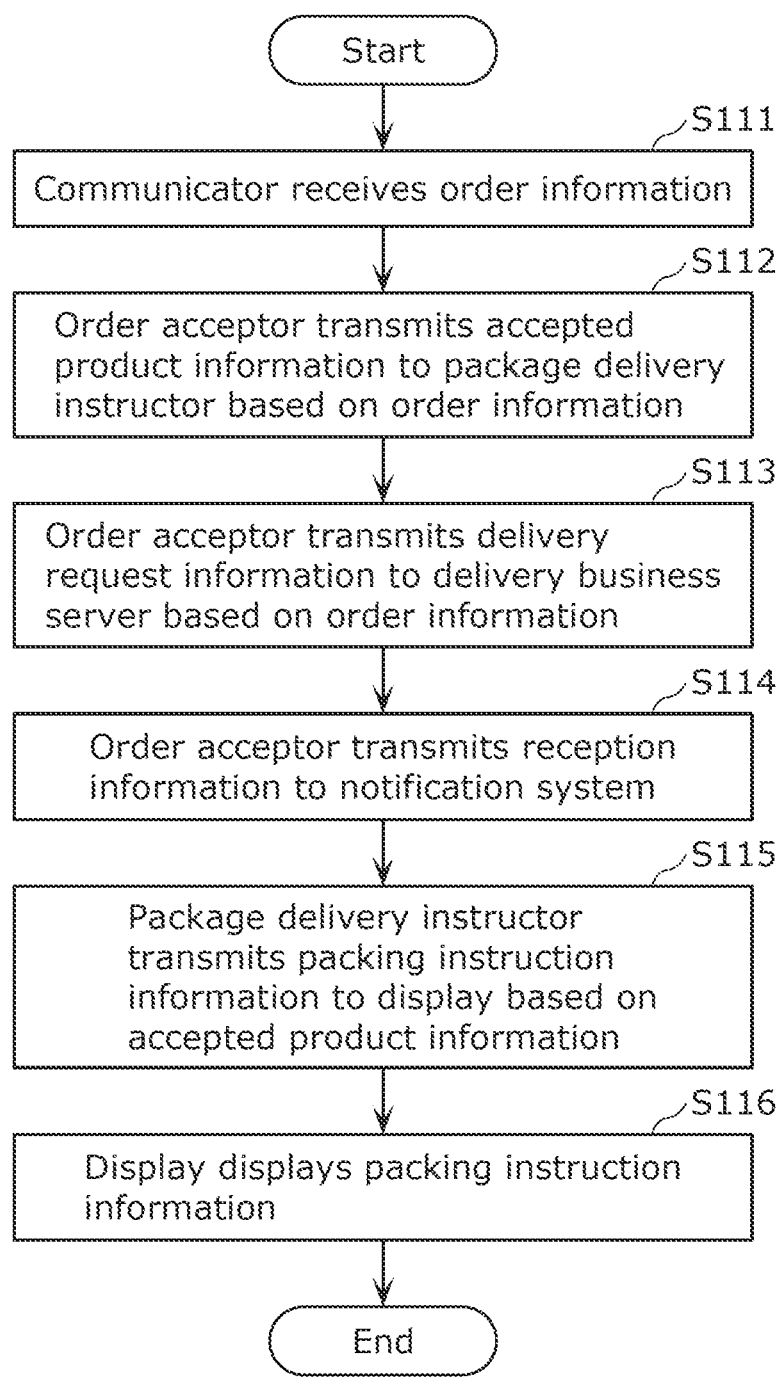
FIG. 19 is a flowchart illustrating processing by a mail order company server according to Embodiment 2.

Processing by mail order company server 100 will be described next with reference to FIG. 19. FIG. 19 is a flowchart illustrating processing by mail order company server 100 according to Embodiment 2.

Communicator 101 receives order information 501 from ordering device 300 (S111). Based on order information 501, order acceptor 102 transmits the ordered product information to package delivery instructor 103 (S112).

Based on order information 501, order acceptor 102 transmits delivery request information 502 to delivery business server 200 via communicator 101 (S113). Based on order information 501, order acceptor 102 transmits reception information 503 to notification system 400 via communicator 101 (S114).

Based on the ordered product information, package delivery instructor 103 transmits the packing instruction information to display 104 (S115). Display 104 displays the packing instruction information (S116).

Processing by Delivery Business Server 200

Figure 20:
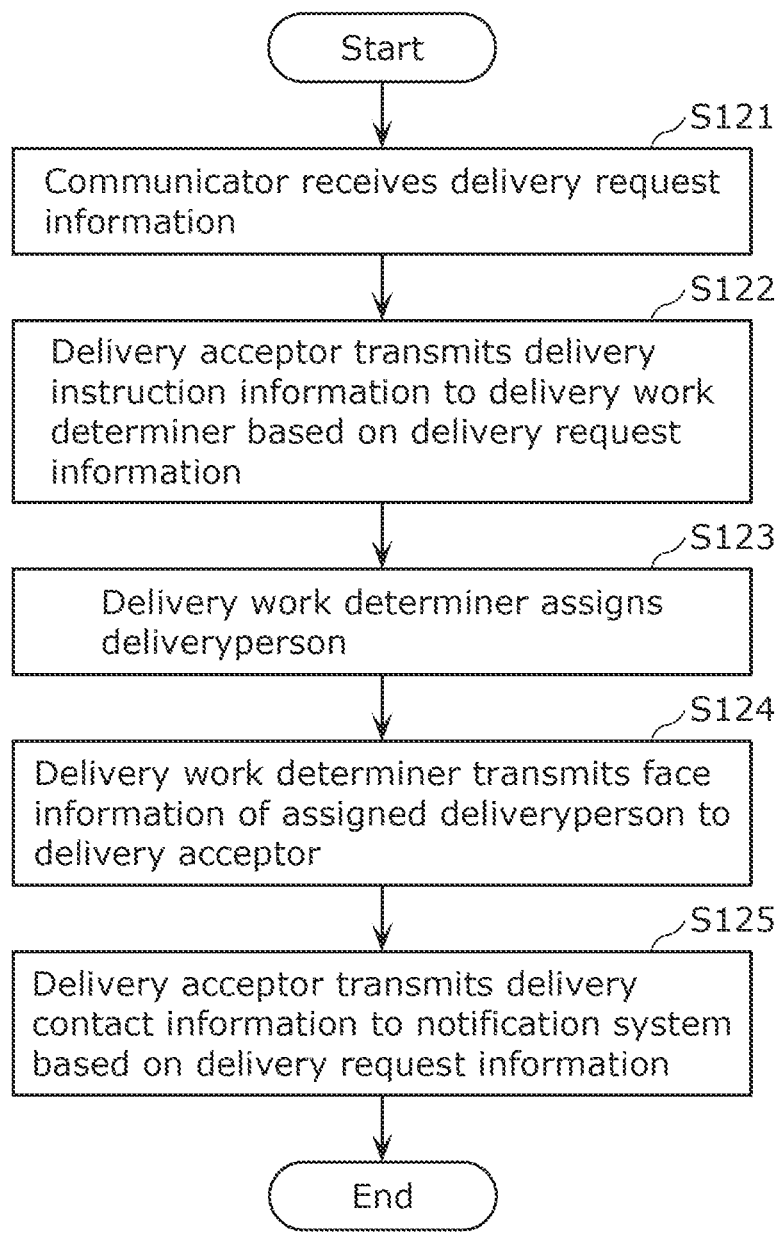
FIG. 20 is a flowchart illustrating processing by a delivery business server according to Embodiment 2.

Processing by delivery business server 200 will be described next with reference to FIG. 20. FIG. 20 is a flowchart illustrating processing by delivery business server 200 according to Embodiment 2.

Communicator 201 receives delivery request information 502 from mail order company server 100 (S121). Based on delivery request information 502, delivery acceptor 203 transmits the delivery instruction information to delivery work determiner 204 (S122). Delivery work determiner 204 assigns a deliveryperson to the delivery request (S123). Delivery work determiner 204 transmits the face information of the assigned deliveryperson to delivery acceptor 203 (S124). Based on delivery request information 502, delivery acceptor 203 transmits delivery contact information 504 to notification system 400 (S125).

Processing by Notification System 400

Figure 21:
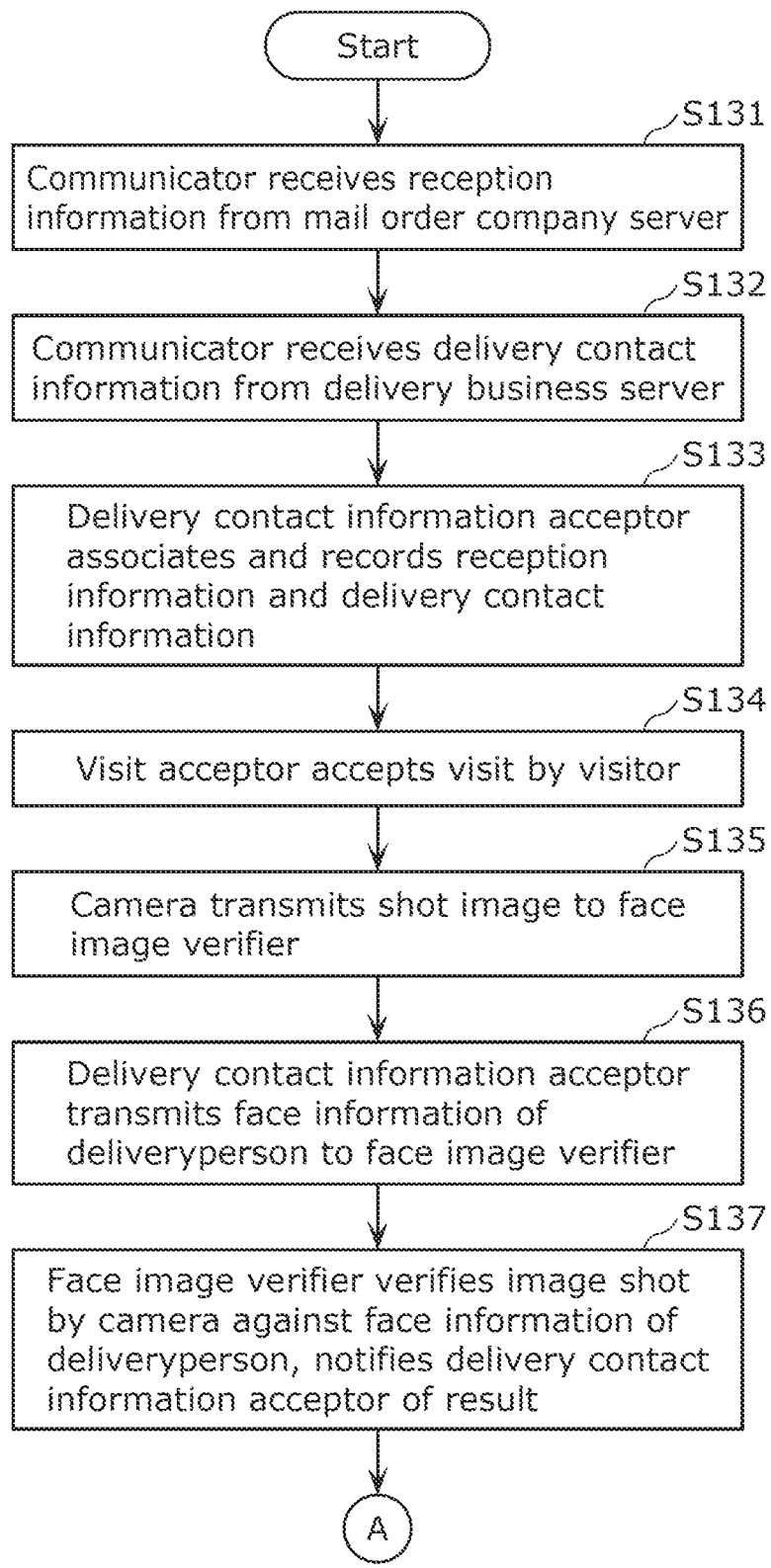
FIG. 21 is a flowchart illustrating processing by the notification system according to Embodiment 2.
Figure 22:
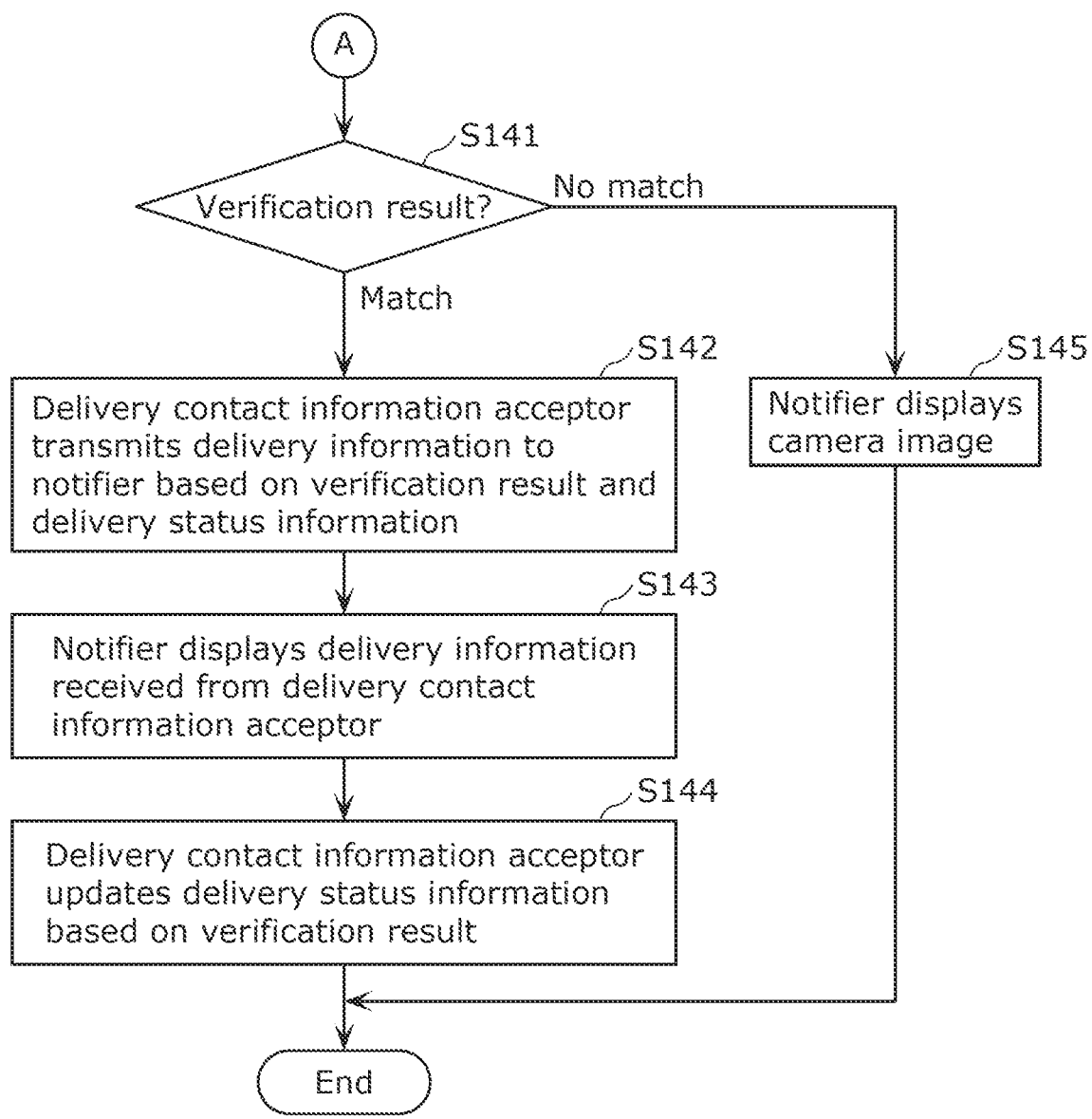
FIG. 22 is a flowchart illustrating processing by the notification system according to Embodiment 2.

Processing by notification system 400 will be described next with reference to FIGS. 21 and 22. FIGS. 21 and 22 are flowcharts illustrating processing by notification system 400 according to Embodiment 2.

First, communicator 401 receives reception information 503 from mail order company server 100 (S131). Furthermore, communicator 401 receives delivery contact information 504 from delivery business server 200 (S132). Delivery contact information acceptor 404 associates reception information 503 with delivery contact information 504 and records the result as delivery status information 505 (S133).

Visit acceptor 402 accepts a visit by visitor 50 (S134). At this time, camera 403 shoots a face image of visitor 50 and transmits the face image to face image verifier 405 (S135). Delivery contact information acceptor 404 transmits the deliveryperson face information to face image verifier 405 (S136). Face image verifier 405 verifies the face image of visitor 50 shot by camera 403 against the deliveryperson face information, and notifies delivery contact information acceptor 404 of the verification result (S137). Whether or not visitor 50 is a deliveryperson is confirmed by this verification.

Here, if the face image of visitor 50 matches any of the deliveryperson face information ("match" in S141), delivery contact information acceptor 404 transmits, to notification device 410, the delivery information indicating which deliveryperson pertaining to which order has arrived, based on the verification result and delivery status information 505 (S142).

Notifier 406 displays the delivery information received from delivery contact information acceptor 404 (S143). At this time, notifier 406 may display the delivery information using a first notification method. For example, notifier 406 may display the delivery information after outputting a first notification sound, or may display the delivery information using a first color.

Based on the verification result, delivery contact information acceptor 404 updates delivery status information 505 (S144). Specifically, delivery contact information acceptor 404 updates the status corresponding to the deliveryperson face information for which the verification has succeeded to "visited".

On the other hand, if the face image of visitor 50 does not match any of the deliveryperson face information ("no match" in S141), notifier 406 displays the image shot by camera 403 (S145). In other words, notifier 406 makes a notification of visit information indicating the visit by visitor 50 to facility 10. At this time, notifier 406 may make the notification of the visit information using a second notification method. The second notification method is different from the first notification method used in step S143. For example, notifier 406 may display the visit information after outputting a second notification sound different from the first notification sound, or may display the visit information using a second color different from the first color.

Examples of Display of Delivery Information

Figure 23A:
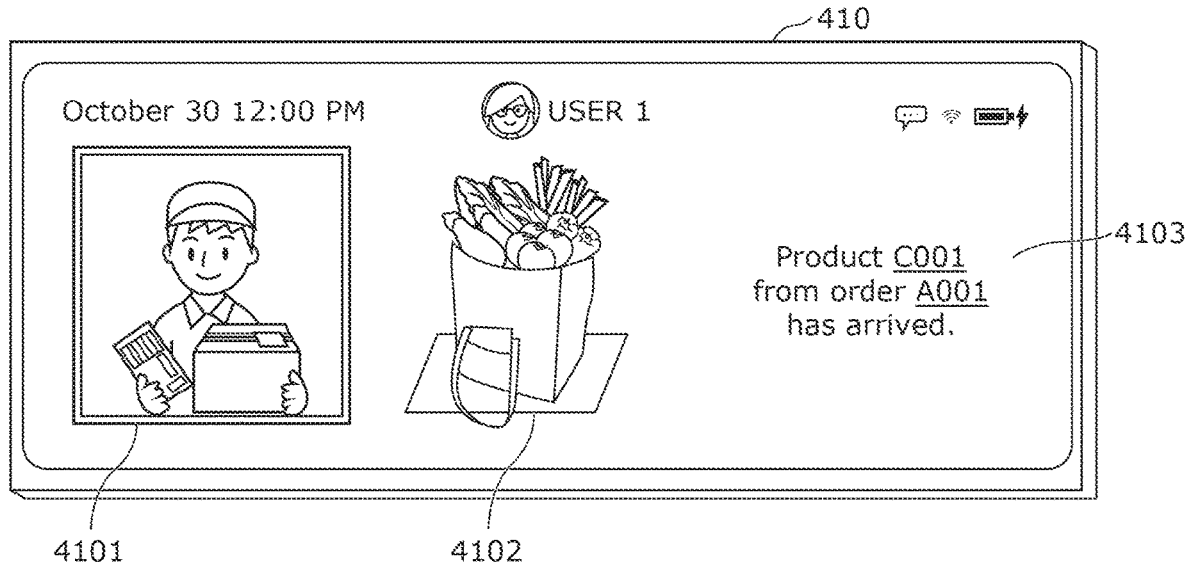
FIG. 23A illustrates an example of a screen that includes delivery information according to Embodiment 2.
Figure 23B:
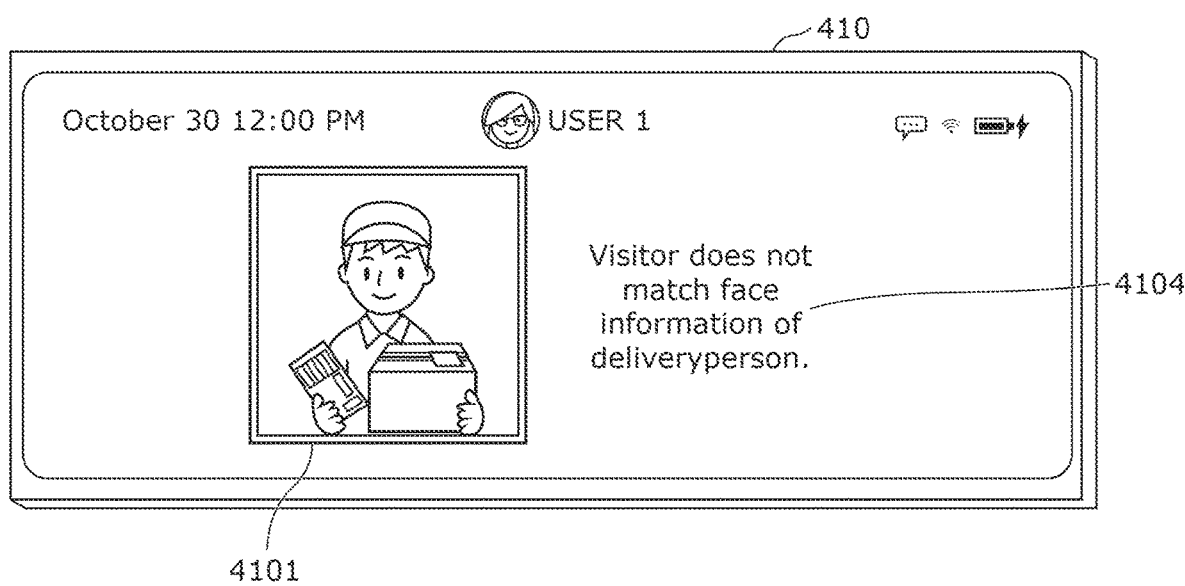
FIG. 23B illustrates an example of a screen that does not include delivery information according to Embodiment 2.

Here, examples of the display screens displayed in each of steps S143 and S145 in FIG. 22 will be described with reference to FIGS. 23A and 23B. FIG. 23A illustrates an example of a screen that includes the delivery information according to Embodiment 2. FIG. 23B illustrates an example of a screen that does not include the delivery information according to Embodiment 2.

In FIG. 23A, image 4101 of the visitor (deliveryperson) shot by camera 403, image 4102 of the item delivered, and delivery information 4103 are displayed in the display of notification device 410. Here, in addition to information indicating that the deliveryperson has arrived, delivery information 4103 includes information enabling user 20 to recognize the order and the ordered product. Note that delivery information 4103 is an example, and the delivery information is not limited thereto. For example, delivery information 4103 may further include information about the mail order company, an order date/time, a product name corresponding to the item, or any combination thereof.

Image 4102 of the item delivered may be obtained from ordering device 300 based on the order ID, or may be obtained from mail order company server 100 based on the reception ID.

In FIG. 23B, image 4101 of the visitor shot by camera 403 and visit information 4104 indicating that the visitor is a visitor whose face image does not match the deliveryperson face information are displayed in the display of notification device 410.

Effects, Etc.

As described thus far, in the control method for notification system 400 according to the present embodiment, (a) face information of a deliveryperson for an item from delivery business server 200 can be obtained, (b) a camera image of the face of visitor 50 to facility 10, shot by a camera installed outside facility 10, can be obtained, (c) the face information can be compared with the camera image and confirm whether or not visitor 50 is a deliveryperson, and (d) when visitor 50 is confirmed to be a deliveryperson, notification device 410 can be used to make a notification of delivery information indicating that a deliveryperson for an item has arrived at facility 10.

Through this, whether or not visitor 50 is a deliveryperson can be confirmed by comparing the face information of a deliveryperson with the face image of visitor 50. When visitor 50 is confirmed to be a deliveryperson, a notification of the delivery information can be made. Accordingly, if visitor 50 is disguised as a deliveryperson, visitor 50 can be confirmed to not be a deliveryperson, which makes it possible to improve security. Furthermore, the comparison is made by notification system 400, which means that the camera image need not be sent to the delivery business, making it possible to protect the privacy of visitor 50 as well.

Additionally, in the control method for notification system 400 according to the present embodiment, (g) when visitor 50 is not confirmed to be a deliveryperson, notification device 410 may make a notification of visit information, indicating the visit by visitor 50 to facility 10, using a second notification method, and in the (d) step, the notification of the delivery information may be made using a first notification method different from the second notification method.

Through this, different notification methods can be used for when visitor 50 is a deliveryperson and when such is not the case, which enables user 20 to easily recognize whether or not visitor 50 is a deliveryperson, and makes it possible to improve security.

Variation on Embodiment 2

A variation on Embodiment 2 will be described next. The present variation differs from the foregoing Embodiment 2 mainly in terms of the functional arrangement of the notification system. Specifically, the present variation differs from the foregoing Embodiment 2 mainly in that some of the functions of the notification device are implemented by a cloud server. The present variation will be described hereinafter with reference to the drawings, focusing on points different from the foregoing Embodiment 2.

Functional Arrangement of Notification System 400A

Figure 24:
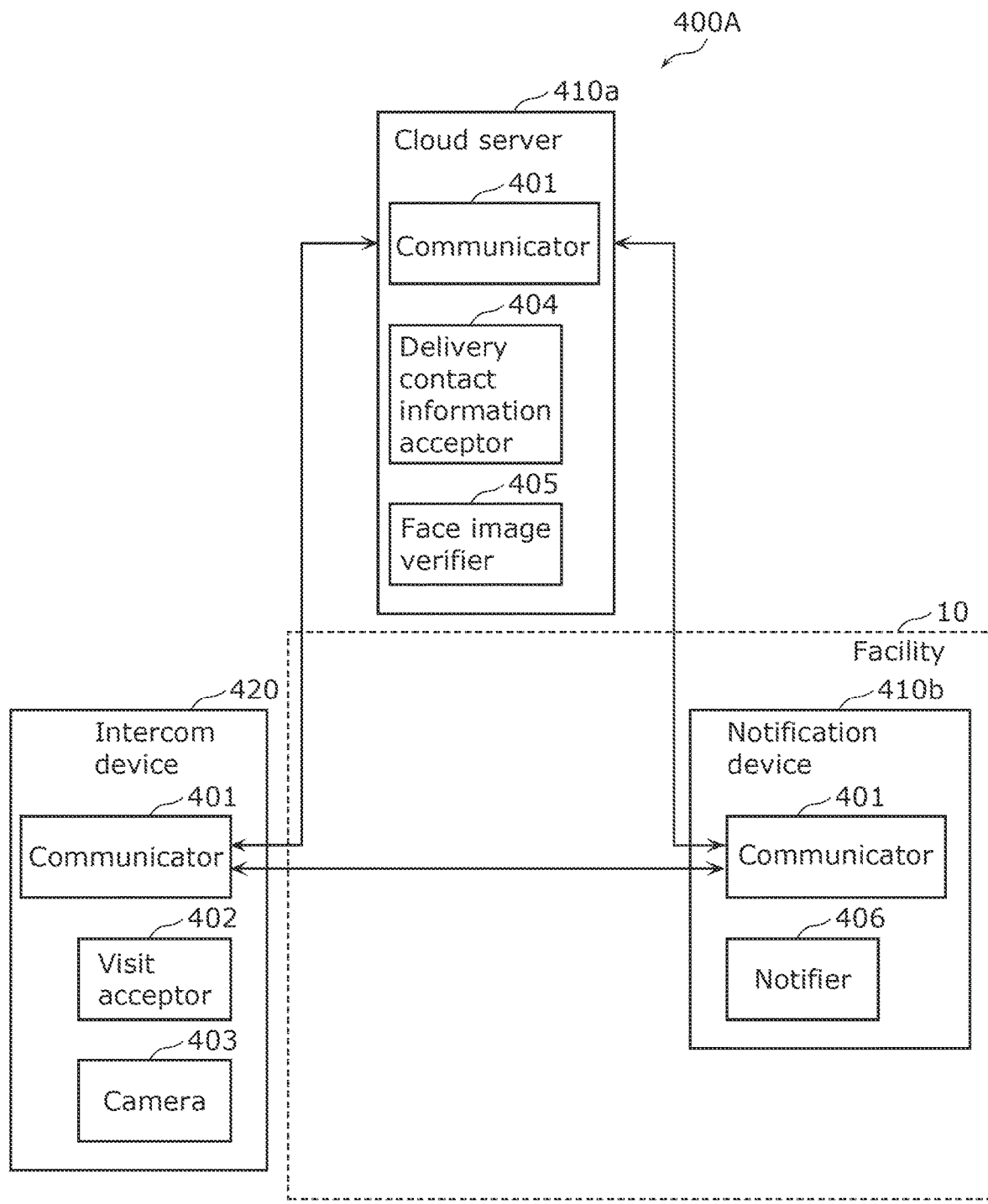
FIG. 24 is a block diagram illustrating the functional arrangement of the notification system according to a variation on Embodiment 2.
Figure 25:
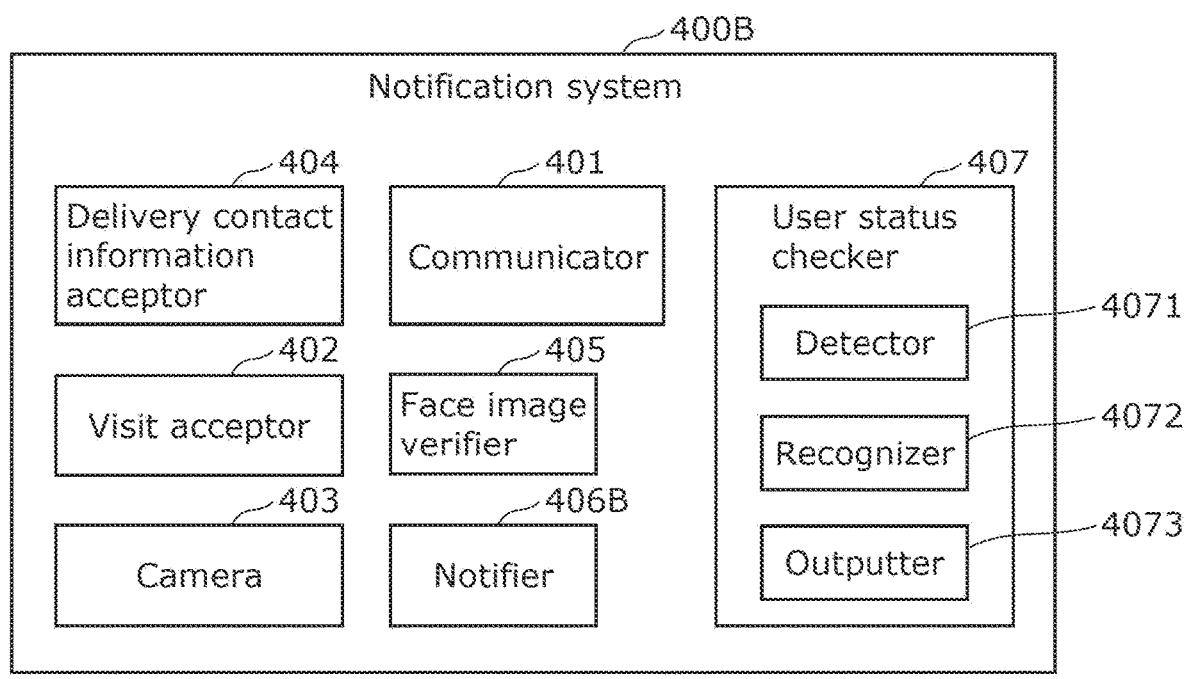
FIG. 25 is a block diagram illustrating the functional configuration of a notification system according to Embodiment 3.

FIG. 24 is a block diagram illustrating the functional arrangement of notification system 400A according to a variation on Embodiment 2. Notification system 400A includes cloud server 410a, notification device 410b, and intercom device 420.

Cloud server 410a is located outside facility 10, and is communicably connected to notification device 410b and intercom device 420. In cloud server 410a, processing is performed through cloud computing. Note that an edge server in which processing is performed through edge computing may be used instead of cloud server 410a.

As illustrated in FIG. 24, cloud server 410a includes communicator 401, delivery contact information acceptor 404, and face image verifier 405.

Notification device 410b is located inside facility 10, and is communicably connected to cloud server 410a and intercom device 420. For example, notification device 410b is fixed to a wall, a floor, or a ceiling of facility 10. Note that notification device 410b may be portable as well. As illustrated in FIG. 24, notification device 410b includes communicator 401 and notifier 406.

Effects, Etc.

As described thus far, with notification system 400A according to the present variation, face image verifier 405, which verifies the face information against the camera image, can be provided in cloud server 410a.

Through this, the verification of the face information against the camera image can be implemented in cloud server 410a, which makes it possible to lighten the processing load on notification device 410b. As such, notification system 400A can be introduced even when notification device 410b has low processing performance, which makes it possible to improve the versatility of notification system 400A.

Embodiment 3

Embodiment 3 will be described next. Embodiment 3 differs from the foregoing Embodiment 2 mainly in that a notification method is switched in response to a user action. The present embodiment will be described hereinafter with reference to the drawings, focusing on points different from the foregoing Embodiment 2.

Functional Configuration of Notification System 400B

Notification system 400B according to the present embodiment includes communicator 401, visit acceptor 402, camera 403, delivery contact information acceptor 404, face image verifier 405, notifier 406B, and user status checker 407. User status checker 407 includes detector 4071, recognizer 4072, and outputter 4073.

Detector 4071 is implemented by a plurality of sensors provided inside facility 10, for example. For example, an image sensor, an infrared sensor, a visible light sensor, a microphone, or the like can be used as the sensors. Detector 4071 detects user 20.

Recognizer 4072 is implemented by, for example, a processor and memory storing commands. Note, however, that recognizer 4072 may be implemented by a dedicated electronic circuit. Recognizer 4072 recognizes an action by user 20 based on an output signal from detector 4071. The output signal from detector 4071 is, for example, a time-series signal of sensor values or data obtained by processing such a signal.

For example, recognizer 4072 determines the action by user 20 corresponding to the output signal from detector 4071 be referring to reference information stored in memory. Here, the reference information is information in which actions by a plurality of users are associated with a plurality of output signal patterns. Note that the reference information may be information in which a plurality of users, a plurality of actions, and a plurality of output signal patterns are associated. In this case, recognizer 4072 can also recognize the user based on the output signal from detector 4071. Note that a past technique may be used for the method for recognizing the action of the user by recognizer 4072, and the method is not particularly limited.

Outputter 4073 outputs, to notifier 406B, action information of user 20 recognized by recognizer 4072.

Notifier 406B determines whether or not user 20 is performing a predetermined action based on the action information of user 20 obtained from user status checker 407. Notifier 406B switches the notification method for the delivery information according to the determination result. Specifically, notifier 406B makes the notification of the delivery information using a first notification method when user 20 is determined to be performing the predetermined action, and makes the notification of the delivery information using a second notification method different from the first notification method when user 20 is not determined to be performing the predetermined action.

For example, a first notification sound may be used in the first notification method, and a second notification sound different from the first notification sound may be used in the second notification method. Additionally, for example, screen transitions may be different between the first notification method and the second notification method.

An action which, for example, makes it difficult for user 20 to receive an item from a deliveryperson is conceivable as the predetermined action. Specifically, for example, cooking, cleaning, watching TV, taking a bath, using the toilet, sleeping, or the like can be used as the predetermined action. Information about such a predetermined action can be stored in memory in advance, for example. Additionally, the predetermined action may be determined based on data received from another device or the like, for example.

Processing by Notification System 400B

Figure 26:
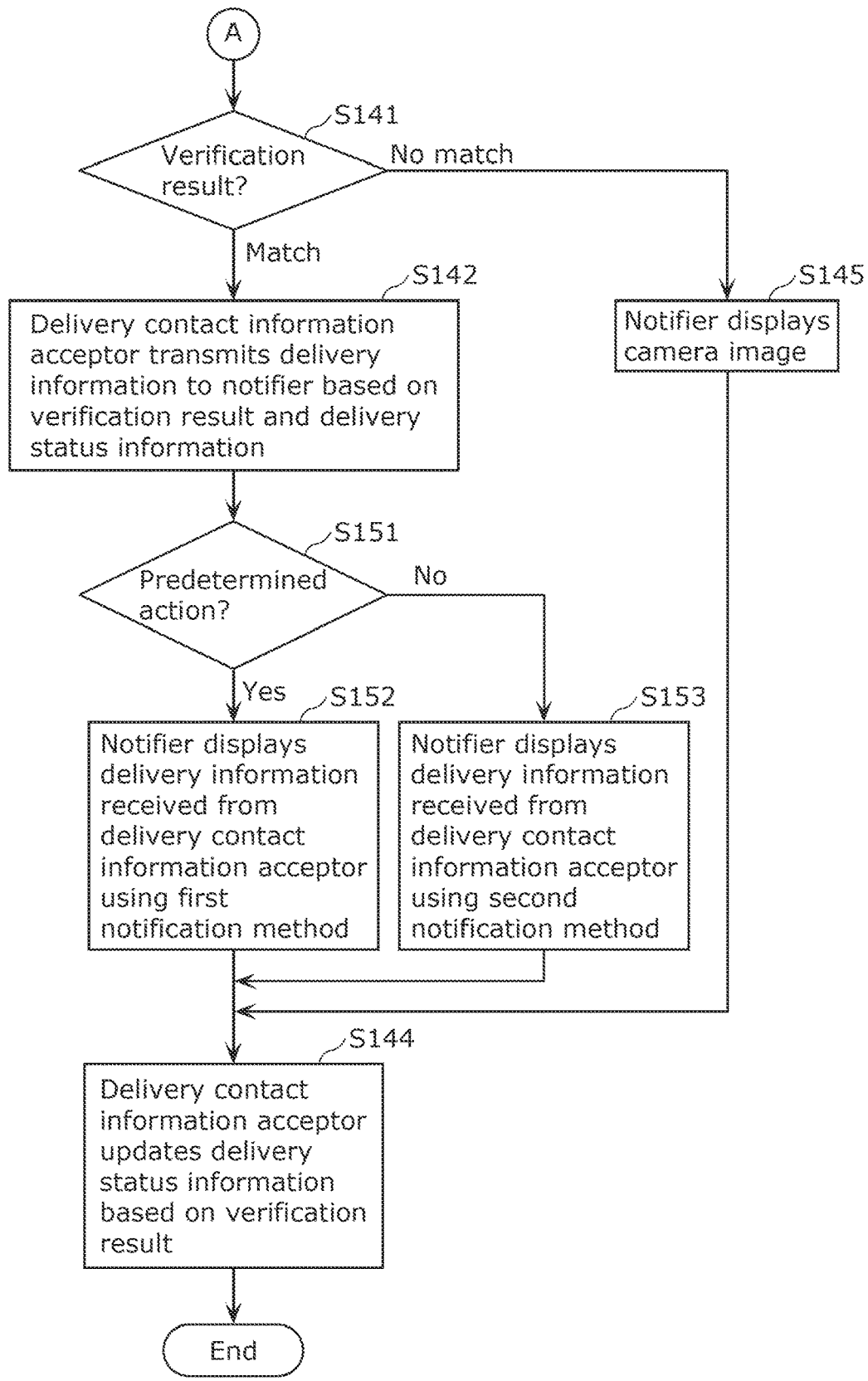
FIG. 26 is a flowchart illustrating processing by the notification system according to Embodiment 3.

Processing by notification system 400B will be described next with reference to FIG. 26. FIG. 26 is a flowchart illustrating processing by notification system 400B according to Embodiment 3.

After steps S131 to S142 are performed in the same manner as in Embodiment 2, notifier 406B determines whether or not user 20 is performing a predetermined action based on the action information of user 20 obtained from user status checker 407 (S151). Here, if user 20 is determined to be performing the predetermined action (Yes in S151), notifier 406B displays the delivery information using the first notification method (S152). On the other hand, if user 20 is not determined to be performing the predetermined action (No in S151), notifier 406B displays the delivery information using the second notification method (S153).

Examples of Display of Delivery Information

Figure 27:
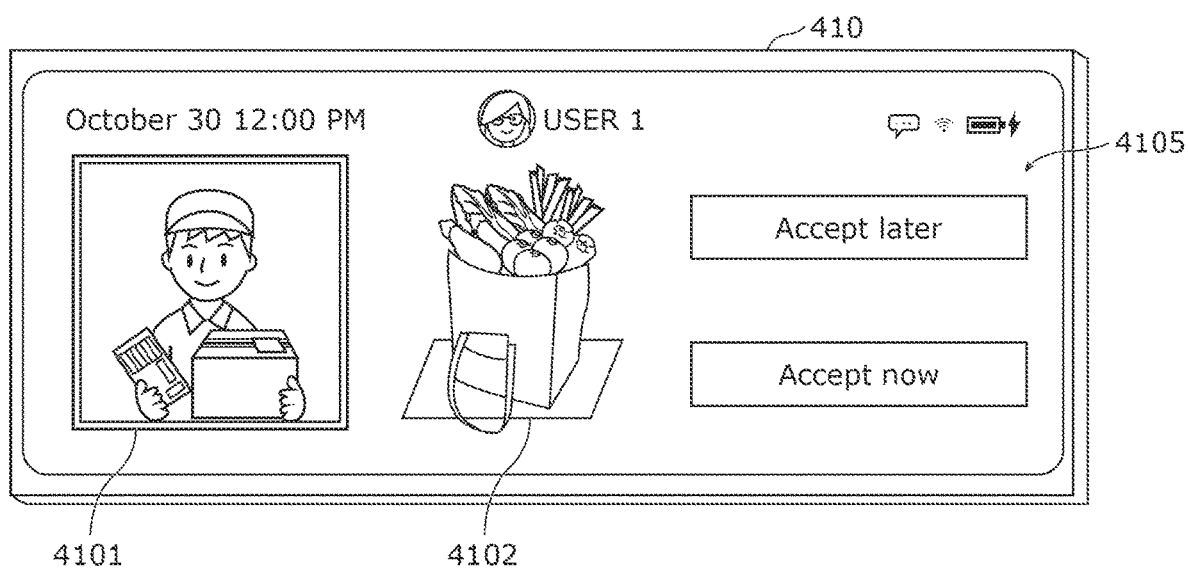
FIG. 27 illustrates an example of a display screen according to Embodiment 3.

Here, the first notification method and the second notification method used in steps S152 and S153 in FIG. 26 will be described with reference to FIGS. 23A and 27. FIG. 27 illustrates an example of a display screen according to Embodiment 3.

The first notification method will be described first. As illustrated in FIG. 27, with the first notification method, notifier 406B displays image 4101 of the visitor (the deliveryperson) shot by camera 403, image 4102 of the item delivered, and acceptance selection buttons 4105 in the display. Acceptance selection buttons 4105 are a graphical user interface enabling one to select whether to accept the item from the deliveryperson later or now. Here, if "accept now" is selected, delivery information 4103 in FIG. 23A is displayed, for example. On the other hand, if "accept later" is selected, a screen for specifying a date/time for redelivery is displayed, for example.

The second notification method will be described next. With the second notification method, delivery information 4103 in FIG. 23A is displayed immediately without acceptance selection buttons 4105 in FIG. 27 being displayed.

Note that the screen transitions in the first notification method and the second notification method, illustrated in FIGS. 23A and 27, are examples, and the screen transitions are not limited thereto.

Effects, Etc.

As described thus far, with the control method for notification system 400B according to the present embodiment, detector 4071 that detects user 20 is located inside facility 10, and furthermore, in the control method, (e) whether or not user 20 is performing a predetermined action can be determined based on an output signal from detector 4071, and in the (d) step, the notification method for the delivery information can be switched according to a result of the determination.

Through this, the notification method for the delivery information can be switched according to the action of user 20. For example, in a situation where user 20 is performing an action that makes it difficult to accept an item from a deliveryperson, a notification of the delivery information can be made using a notification method appropriate for that situation.

Variation on Embodiment 3

A variation on Embodiment 3 will be described next. The present variation differs from the foregoing Embodiment 3 mainly in that the notification device that makes the notification of the delivery information is switched among a plurality of notification devices, according to actions of a plurality of users. The present variation will be described hereinafter with reference to the drawings, focusing on points different from the foregoing Embodiment 3.

In the present variation, a plurality of notification devices 410b are located inside facility 10. Additionally, for example, detector 4071 is implemented as a plurality of sensors provided at different locations in facility 10, each of which detects a plurality of users 20 located inside facility 10.

Based on the output signal from detector 4071, cloud server 410a selects at least one user 20, among the plurality of users 20, who is not performing the predetermined action. Cloud server 410a transmits the delivery information to at least one notification device 410b, among the plurality of notification devices 410b, that is located in a predetermined range from user 20 selected. The at least one notification device 410b makes a notification of the delivery information received from cloud server 410a.

The predetermined range is defined by a distance determined in advance, for example. In this case, the distance determined in advance may be stored in advance in memory. The predetermined range may be defined by a region demarked in advance within facility 10 (e.g., a kitchen, a child's room, or the like).

Examples of Display of Delivery Information

Figure 28:
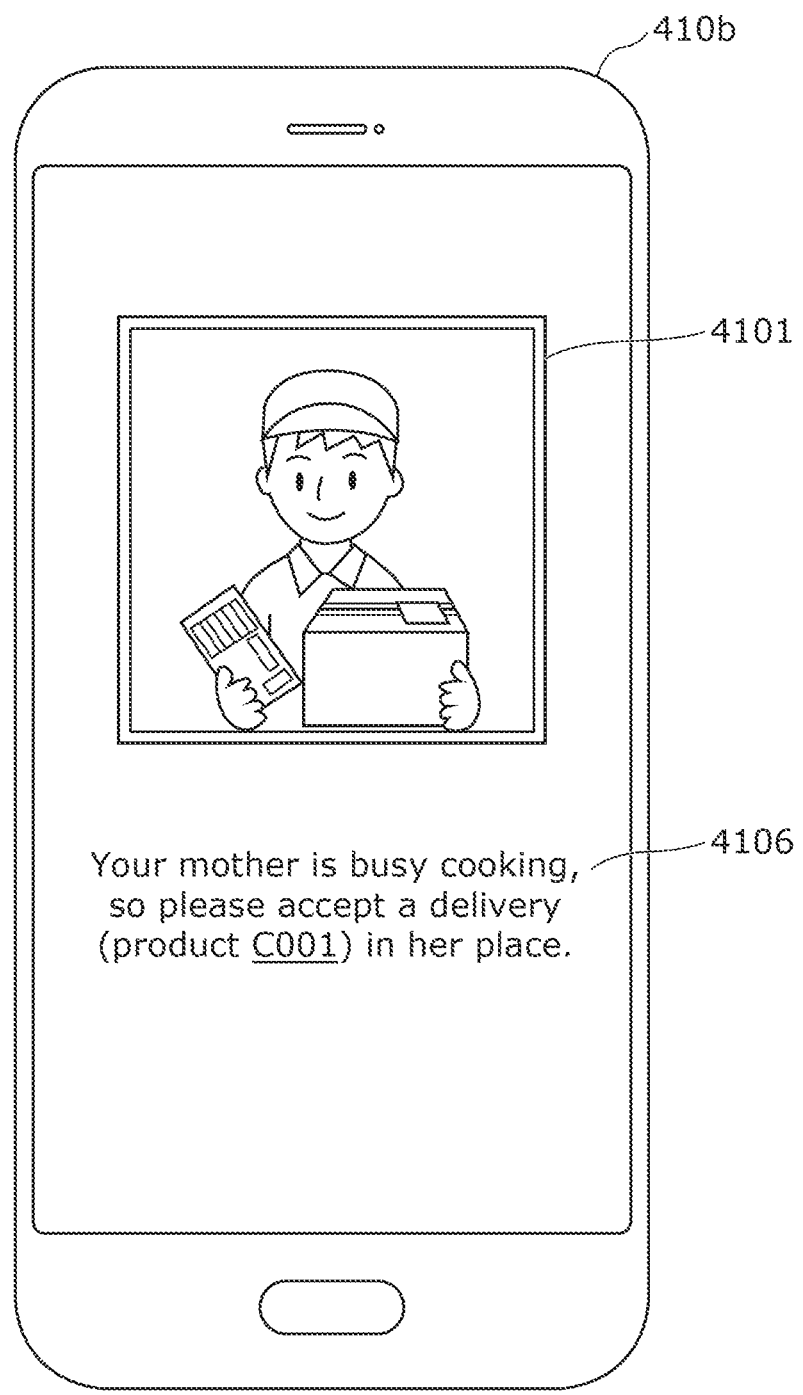
FIG. 28 illustrates an example of a screen that includes delivery information according to a variation on Embodiment 3.
Figure 29:
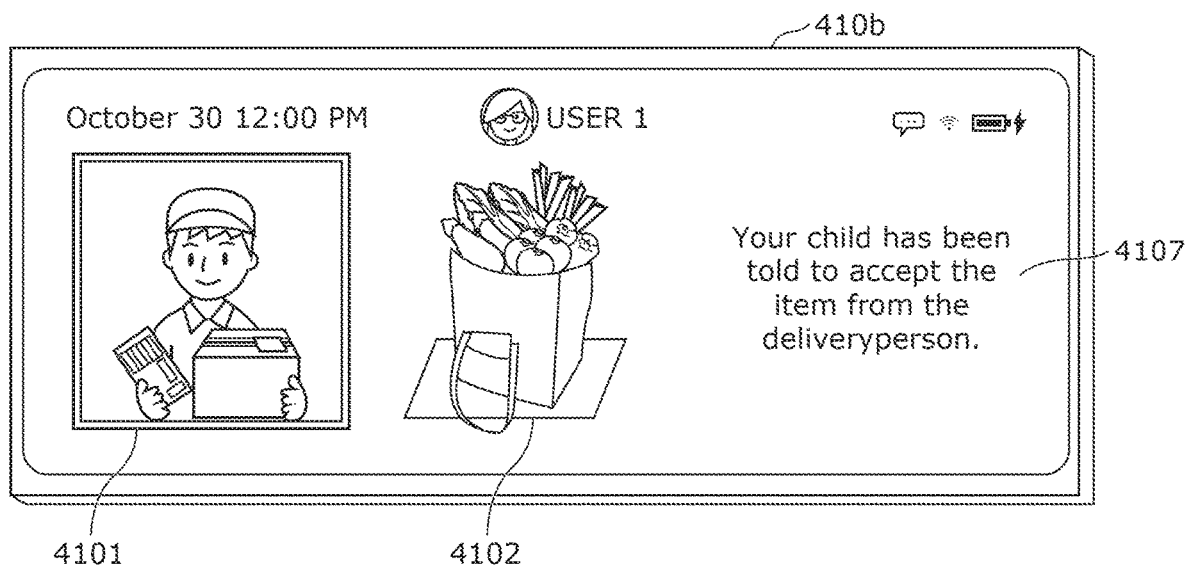
FIG. 29 illustrates an example of a screen that does not include delivery information according to a variation on Embodiment 3.

Examples of display screens in the present variation will be described with reference to FIGS. 28 and 29. FIG. 28 illustrates an example of a screen that includes delivery information according to a variation on Embodiment 3. FIG. 29 illustrates an example of a screen that does not include delivery information according to a variation on Embodiment 3.

Here, in facility 10, a mother is cooking in the kitchen, and a child is reading a book in the child's room. In this case, when the face image of visitor 50 and the deliveryperson face information match, the child, who is not performing the predetermined action of cooking, is selected from among the mother and the child located inside facility 10. Notification device 410b located in the child's room then displays, as delivery information 4106, text information reading "your mother is busy cooking, so please accept a delivery (product C0001) in her place". On the other hand, notification device 410b located in the kitchen displays text information 4107 reading "your child has been told to accept the item from the deliveryperson".

This makes it possible for the child to reliably accept the delivery instead of the mother, who is too busy cooking to accept the delivery.

Effects, Etc.

As described thus far, in the control method for the notification system according to the present variation, notification system 400B includes a plurality of notification devices 410b; detector 4071 detects each of a plurality of users 20; and furthermore, in the control method, (f) at least one user 20, among the plurality of users 20, who is not performing a predetermined action, can be selected based on an output signal from detector 4071, and in the (d) step, a notification of the delivery information can be made using at least one notification device 410b among the plurality of notification devices 410b. Here, the at least one notification device 410b is located in a predetermined range from the at least one user 20 selected.

Through this, user 20 who is performing an action that makes it difficult to accept an item from a deliveryperson can be avoided, and user 20 who is not performing such an action can be notified of the delivery information. This makes it possible for user 20 to reliably receive the item from the deliveryperson.

Embodiment 4

Embodiment 4 will be described next. Embodiment 4 differs from the foregoing Embodiment 2 mainly in that the notification method for the visit information is switched based on planned visit information about a visitor to the facility who is different from the deliveryperson of an item.

The present embodiment will be described hereinafter with reference to the drawings, focusing on points different from the foregoing Embodiment 2.

Note that the configuration of notification system 400 according to the present embodiment is the same as in the foregoing Embodiment 2, and thus drawings and descriptions thereof will be omitted Processing by Notification System 400

Figure 30:
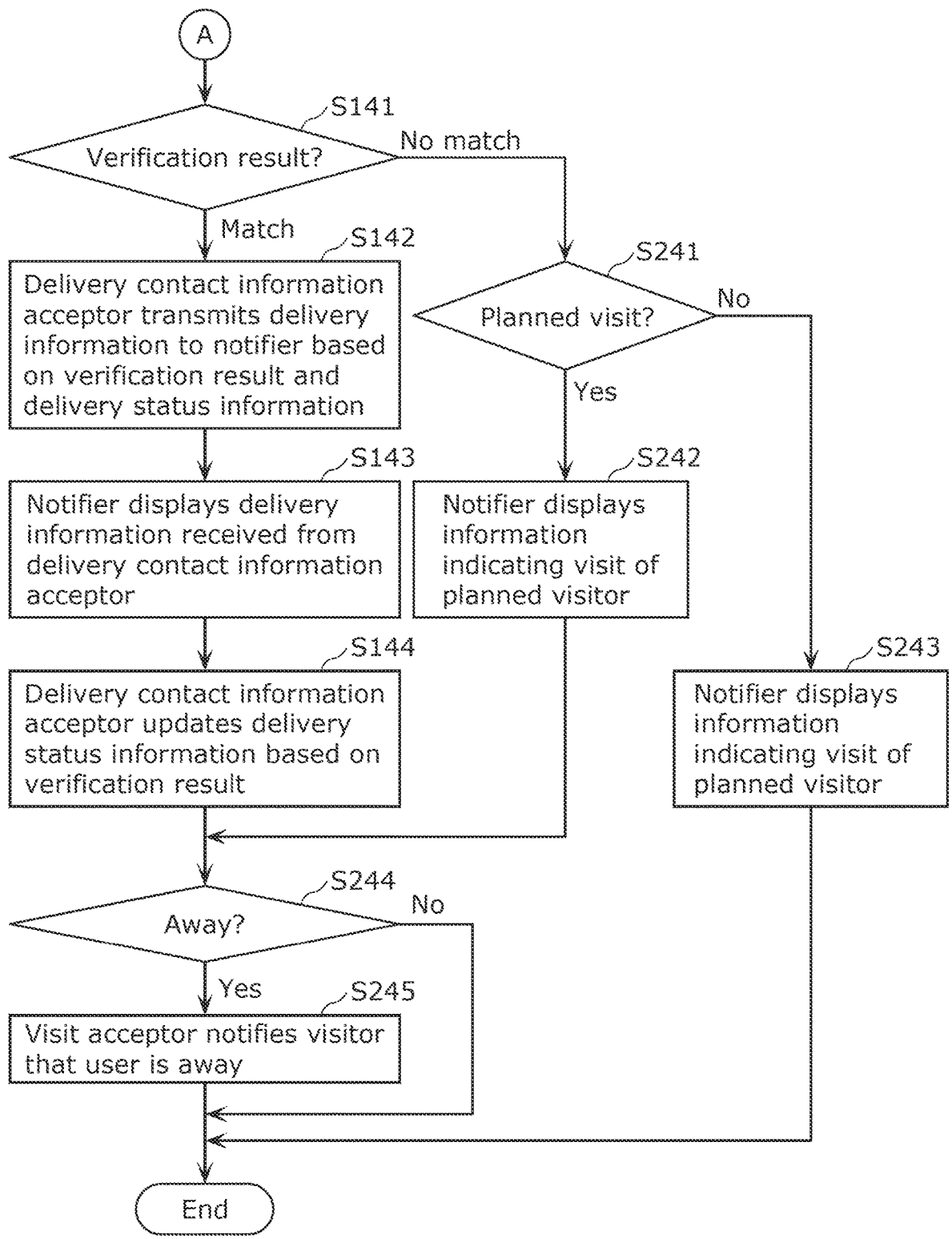
FIG. 30 is a flowchart illustrating processing by a notification system according to Embodiment 4.

Processing by notification system 400 according to the present embodiment will be described with reference to FIG. 30. FIG. 30 is a flowchart illustrating processing by notification system 400 according to Embodiment 4.

If the face image of visitor 50 does not match any of the deliveryperson face information ("no match" in S141), notification device 410 obtains the planned visit information of visitors to facility 10 in a predetermined period, and determines whether or not the visit date/time of visitor 50 is within a predetermined time range from the planned visit date/time (S241). The planned visit information includes first planned visit information indicating a planned delivery date/time for an item, and second planned visit information indicating a planned visit date/time for a visitor different from the deliveryperson of the item. The first planned visit information is, for example, the delivery status information illustrated in FIG. 16E. The predetermined time range may be determined in advance empirically or experimentally, and is stored in advance in memory, for example.

Here, if the visit date/time is within the predetermined time range from the planned visit date/time (Yes in S241), notifier 406 displays visit information indicating a planned visit by a visitor (S242). For example, notifier 406 displays text information reading "there was a planned visit by a visitor", "person A visited", or the like. On the other hand, if the visit date/time is not within the predetermined time range from the planned visit date/time (No in S241), notifier 406 displays visit information indicating an unplanned visit by a visitor (S243), and ends the processing. For example, notifier 406 displays text information reading "there was a unplanned visit by a visitor", "there was a visitor", or the like.

After step S144 or step S242, notification device 410 determines whether or not user 20 is away from facility 10 (S244). For example, notification device 410 determines that user 20 is away based on schedule information of user 20. Additionally, notification device 410 may determine that user 20 is away if, after making a notification of the delivery information or the visit information, no response from user 20 is detected for a predetermined length of time. The user's response can be detected based on data obtained from a sensor located in facility 10, or whether or not the user has operated notification device 410.

Here, if user 20 is away (Yes in S244), visit acceptor 402 notifies visitor 50 that user 20 is away (S245), and the processing ends.

Note that in the notification of the delivery information or the visit information in steps S143, S242, and S243, voice indicating the delivery information or the visit information may be output instead of displaying the delivery information or the visit information. Additionally, a sound or music may be output in addition to the display of the delivery information or the visit information.

Additionally, first to third notification methods which are different from each other may be used in the notification of the delivery information or the visit information in steps S143, S242, and S243. For example, different notification sounds may be output in the first to third notification methods. Additionally, for example, the information may be displayed using different colors in the first to third notification methods.

Effects, Etc.

As described thus far, in the control method for notification system 400 according to the present embodiment, in the (d) step, the notification of the delivery information is made using a first notification method, and furthermore, in the control method, (h) information of a planned visit by visitor 50 to facility 10 can be obtained in a predetermined period, the information of the planned visit including first planned visit information indicating a planned delivery date/time of an item and second planned visit information indicating a planned visit date/time of a visitor different from the deliveryperson of the item; (i) when visitor 50 is not confirmed to be a deliveryperson and the visit date/time of visitor 50 is within a predetermined time range from the planned visit date/time, notification device 410 can be used to make a notification of the visit information indicating the visit by visitor 50 to facility 10 through the second notification method; and (j) when visitor 50 is not confirmed to be a deliveryperson and the visit date/time of visitor 50 is not within the predetermined time range from the planned visit date/time, notification device 410 can be used to make a notification of the visit information indicating the visit by visitor 50 to facility 10 through a third notification method.

Through this, different notification methods can be used for a deliveryperson, a planned visitor, and an unplanned visitor. As such, user 20 can easily recognize an unplanned visitor, which makes it possible to improve security.

Additionally, in the case of the third notification method, visitor 50 is not a planned visitor, and thus communicating that user 20 is away may increase the security risk. Accordingly, for example, if the user's response cannot be detected in a predetermined length of time after a notification made through the first method and the second method, visit acceptor 402 can communicate information to visitor 50 indicating that the user is away, whereas after the notification made through the third method, the user being away is not communicated regardless of the user's response, which makes it possible to improve the convenience for visitor 50 while suppressing an increase in the security risk.

Embodiment 5

Embodiment 5 will be described next. Embodiment 5 differs from the foregoing embodiments in that an application program for verifying a face is switched for each delivery business. The present embodiment will be described hereinafter, focusing on points different from the foregoing embodiments.

Note that the configuration of notification system 400 according to the present embodiment is the same as in the foregoing Embodiment 2, and thus drawings and descriptions thereof will be omitted.

Processing by Notification System 400

Figure 31:
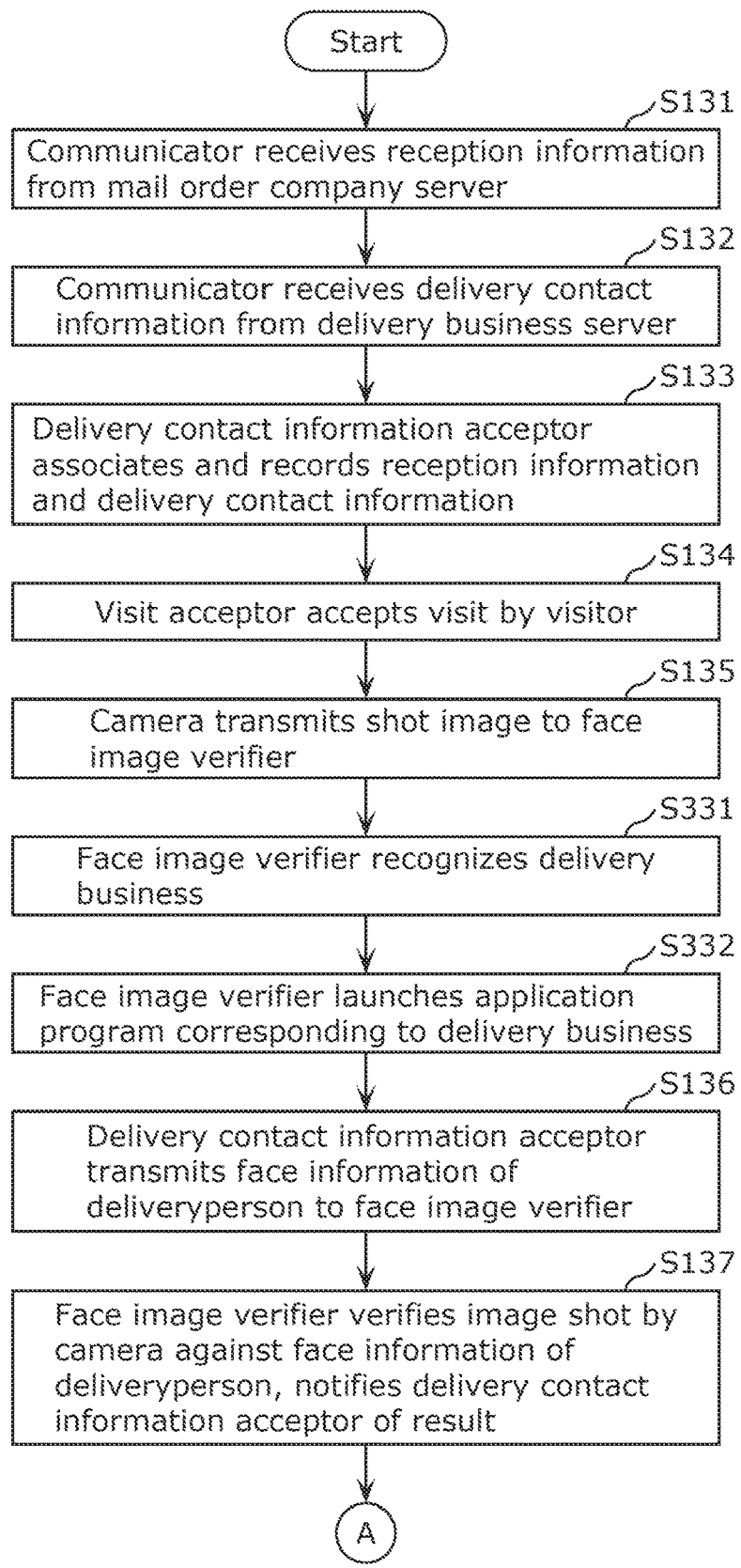
FIG. 31 is a flowchart illustrating processing by a notification system according to Embodiment 5.

Processing by notification system 400 according to the present embodiment will be described with reference to FIG. 31. FIG. 31 is a flowchart illustrating processing by notification system 400 according to Embodiment 5.

After the processing of steps S131 to S135 is performed, face image verifier 405 recognizes the delivery business (S331). For example, face image verifier 405 recognizes the delivery business based on the uniform or the like of the deliveryperson, from the image of the visitor shot by camera 403.

Next, face image verifier 405 launches an application program corresponding to the recognized delivery business, among a plurality of application programs corresponding to a plurality of delivery businesses (S332). The application program corresponding to the delivery business is a program which is permitted to access the deliveryperson face information of that delivery business. In other words, the application program can access the deliveryperson face information of at least one delivery business, but cannot access the deliveryperson face information of other delivery businesses, among the plurality of delivery businesses.

Then, the processing of step S136 and/or step S137 is performed using the application program that has been launched.

Although FIG. 31 illustrates an example in which the application program is launched after the delivery business is recognized from the image shot by camera 403, it should be noted that the processing is not limited thereto. For example, face image verifier 405 may, for example, refer to delivery status information 505 illustrated in FIG. 16E and launch the application program corresponding to the business ID based on a planned delivery date/time having an "unvisited" status. Additionally, face image verifier 405 may obtain location information of a deliveryperson from delivery business server 200 and launch the application program when the deliveryperson approaches facility 10. Additionally, when the deliveryperson checks the item using a terminal in front of facility 10, a message may be transmitted from delivery business server 200 to notification system 400, and the application program may be launched based on that message.

Effects, Etc.

As described thus far, in the control method for notification system 400 according to the present embodiment, furthermore, before the (c) step, (j) a delivery business related to the visitor is recognized from the camera image of visitor 50 shot by camera 403, and in the (c) step, the face information and the camera image are compared using an application program corresponding to the delivery business recognized.

Through this, when it is necessary to switch the application program according to the delivery business, the switch can be performed automatically.

Embodiment 6

Embodiment 6 will be described next. The present embodiment will describe a service provision system that provides a service including a notification of delivery information.

Overview of Services Provided

Figure 32A:
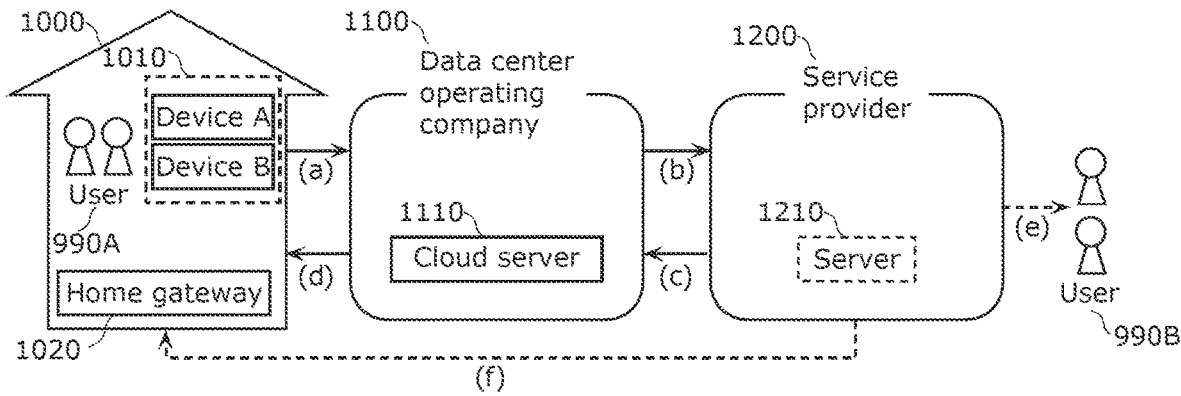
FIG. 32A illustrates an overview of a service provision system according to Embodiment 6.

FIG. 32A illustrates an overview of a service provision system according to Embodiment 6.

Group 1000 is, for example, a company, an organization, a household, or the like, and can be of any size. Group 1000 includes device A and device B, which are included in a plurality of devices 1010, and home gateway 1020. The notification device according to one of the foregoing embodiments can be given as an example of device A. The plurality of devices 1010 includes devices that can connect to the Internet (e.g., a smartphone, a PC, a TV, or the like), as well as devices that cannot connect to the Internet by themselves (e.g., lighting, a washing machine, or the like). However, there may be devices that cannot connect to the Internet by themselves by can connect to the Internet via home gateway 1020. Group 1000 also includes user 990A who uses the plurality of devices 1010.

Figure 32B:
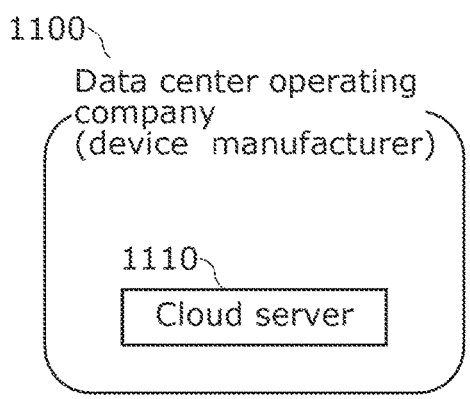
FIG. 32B illustrates an example of a data center operating company according to Embodiment 6.
Figure 32C:
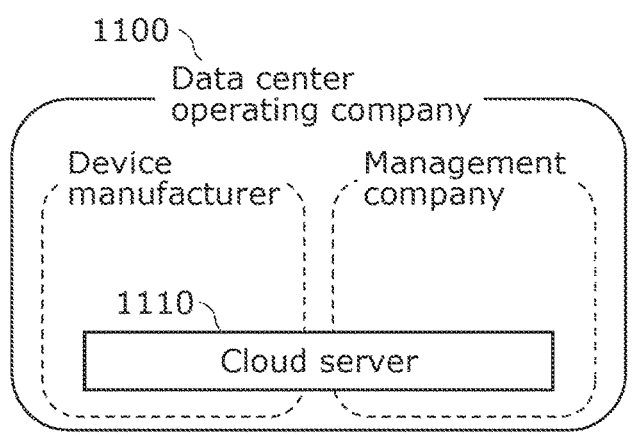
FIG. 32C illustrates an example of a data center operating company according to Embodiment 6.

Data center operating company 1100 includes cloud server 1110. Cloud server 1110 is a virtualized server that links various devices over the Internet. The control device, the cloud server, and the like in one of the foregoing embodiments can be given as an example of cloud server 1110. Cloud server 1110 mainly manages huge amounts of data (big data) that is difficult to handle with ordinary database management tools and the like. Data center operating company 1100 manages data, manages cloud server 1110, operates data centers that performs those functions, and the like. Duties performed by data center operating company 1100 will be described in detail later. Here, data center operating company 1100 is not limited to a company that only manages data, operates cloud server 1110, and the like. For example, if a device manufacturer that develops and manufactures one of the plurality of devices 1010 also manages data, manages cloud server 1110, and the like, that device manufacturer corresponds to data center operating company 1100 (FIG. 32B). Furthermore, data center operating company 1100 is not limited to one company. For example, when a device manufacturer and another management company manage data, operate cloud server 1110, or the like in a cooperative or shared manner, one or both are assumed to correspond to data center operating company 1100 (FIG. 32C).

Service provider 1200 includes server 1210. Server 1210 mentioned here may be of any size, and includes, for example, memory and the like in a PC for personal use. There may be cases where the service provider does not include server 1210.

Note that home gateway 1020 is not required for the aforementioned service. For example, home gateway 1020 is not needed if cloud server 1110 performs all of the data management. Additionally, there may be cases where there are no devices which cannot connect to the Internet by themselves, such as when all devices in a household are connected to the Internet.

The flow of information in the aforementioned service will be described next.

First, device A or device B in group 1000 transmits information obtained by each device to cloud server 1110 of data center operating company 1100. Cloud server 1110 accumulates the information from device A or device B ((a) in FIG. 32A). The information accumulated here is information indicating, for example, an operating status, operation date/time, operating mode, location, and the like of the plurality of devices 1010. For example, this is all information that can be obtained from all devices, including, but not limited to, TV viewing history, recording setting information for a recorder, a date/time a washing machine is run and an amount of laundry, a date/time/number of times a refrigerator is opened and closed, the amount of food in the refrigerator, and the like. The information may be provided directly to cloud server 1110 over the Internet from the plurality of devices 1010 themselves. Alternatively, the information may be temporarily accumulated in home gateway 1020 from the plurality of devices 1010, and then provided to cloud server 1110 from home gateway 1020.

Next, cloud server 1110 of data center operating company 1100 provides the accumulated information to service provider 1200 in set units. Here, the "set unit" may be a unit in which the data center operating company can organize the accumulated information and provide the information to service provider 1200, or may be a unit requested by service provider 1200. Although the term "set unit" is used, the unit need not be constant, and the amount of information provided may vary depending on the circumstances. The information is saved in server 1210 included in service provider 1200 as necessary ((b) in FIG. 32A). Then, service provider 1200 organizes the information into information compatible with the service to be provided to the user, and provides the information to the user. The user provided with the information may be user 990A who uses the plurality of devices 1010, or may be an outside user 990B. The method for providing the service to the user may involve providing the service directly to the user from the service provider, for example ((e) and (f) in FIG. 32A). Alternatively, the method for providing the service to the user may involve providing the service to the user via cloud server 1110 of data center operating company 1100 again, for example ((c) and (d) in FIG. 32A). Furthermore, cloud server 1110 of data center operating company 1100 may organize the information into information compatible with the service to be provided to the user, and then provide the information to service provider 1200.

Note that user 990A and user 990B may be the same or different users.

Figure 33:
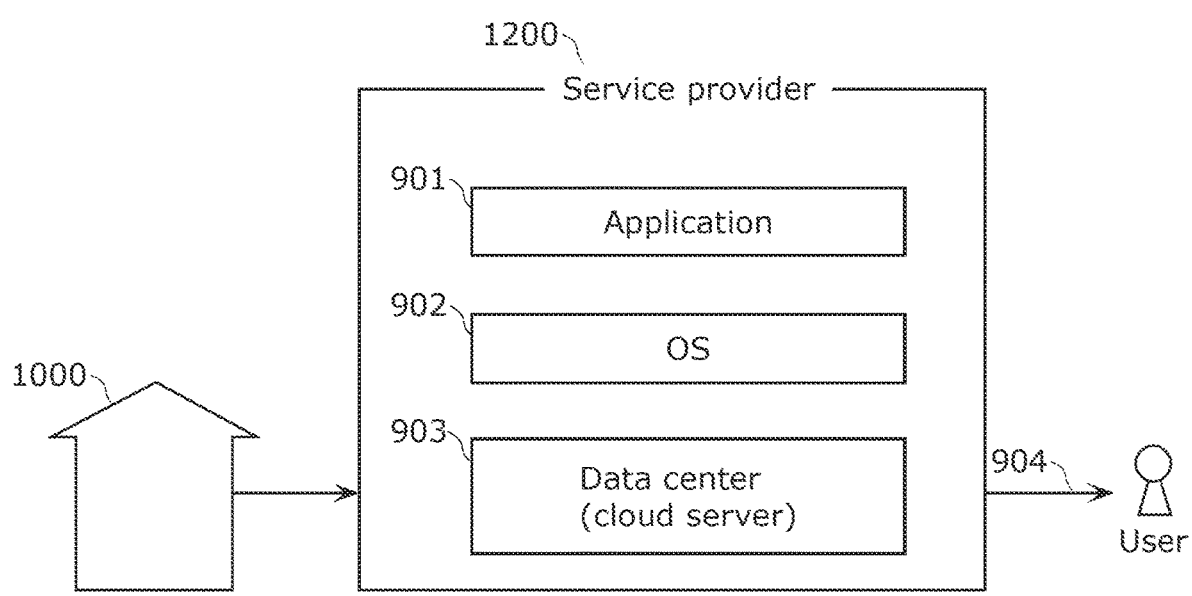
FIG. 33 illustrates service type 1 (in-house data center type) according to Embodiment 6.

The technique described in the foregoing aspect can be implemented in, for example, the following types of cloud services. However, the types through which the technique described in the foregoing aspect are not limited thereto.
Service Type 1: In-House Data Center Type FIG. 33 illustrates service type 1 (an in-house data center type). This type is a type in which service provider 1200 obtains the information from group 1000 and provides the service to the user. With this type, service provider 1200 has the functions of a data center operating company. In other words, the service provider has cloud server 1110 which manages big data. As such, there is no data center operating company.

Figure 34:
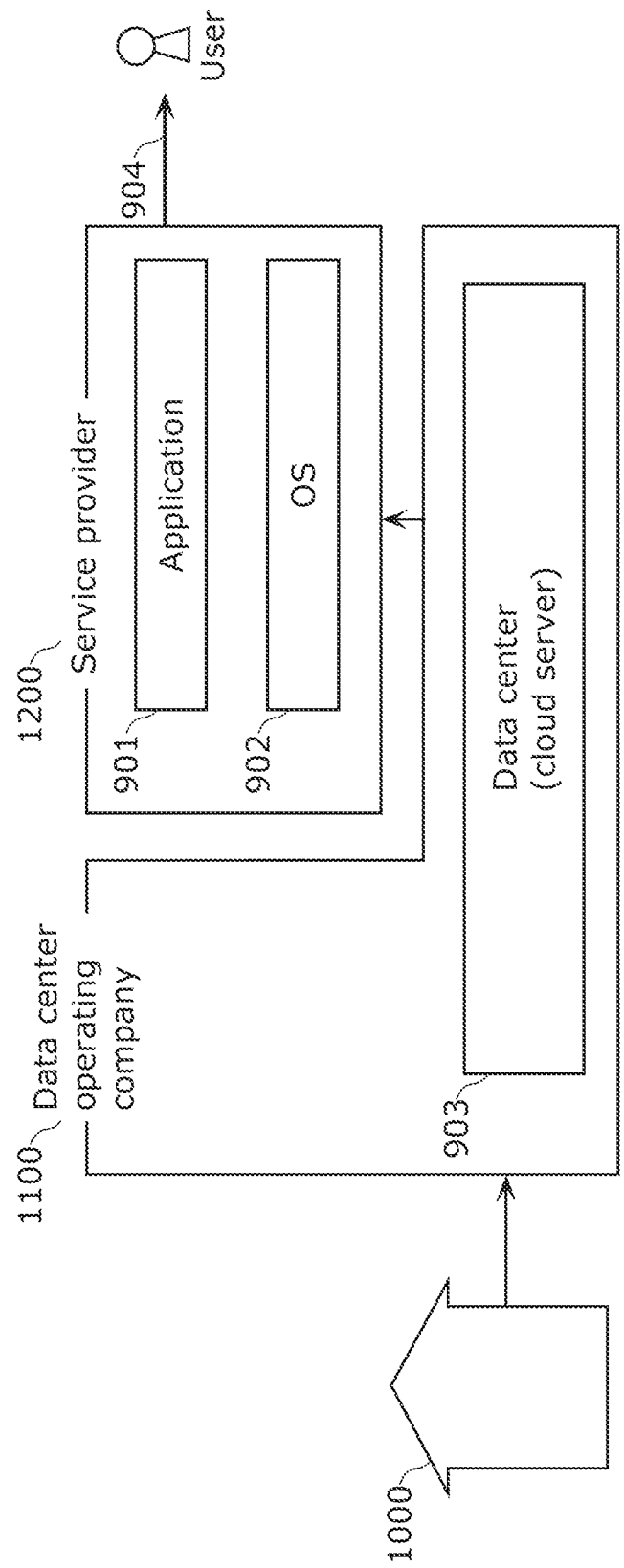
FIG. 34 illustrates service type 2 (IaaS use type) according to Embodiment 6.

With this type, service provider 1200 operates and manages data center 903 (cloud server 1110). Additionally, service provider 1200 manages OS 902 and application 901. Service provider 1200 provides service 904 using OS 902 and application 901 managed by service provider 1200.
Service Type 2: IaaS Use Type FIG. 34 illustrates service type 2 (IaaS use type). Here, "IaaS" is an acronym of "Infrastructure as a Service", and is a cloud service delivery model that provides the infrastructure itself for building and operating computer systems as a service over the Internet.

Figure 35:
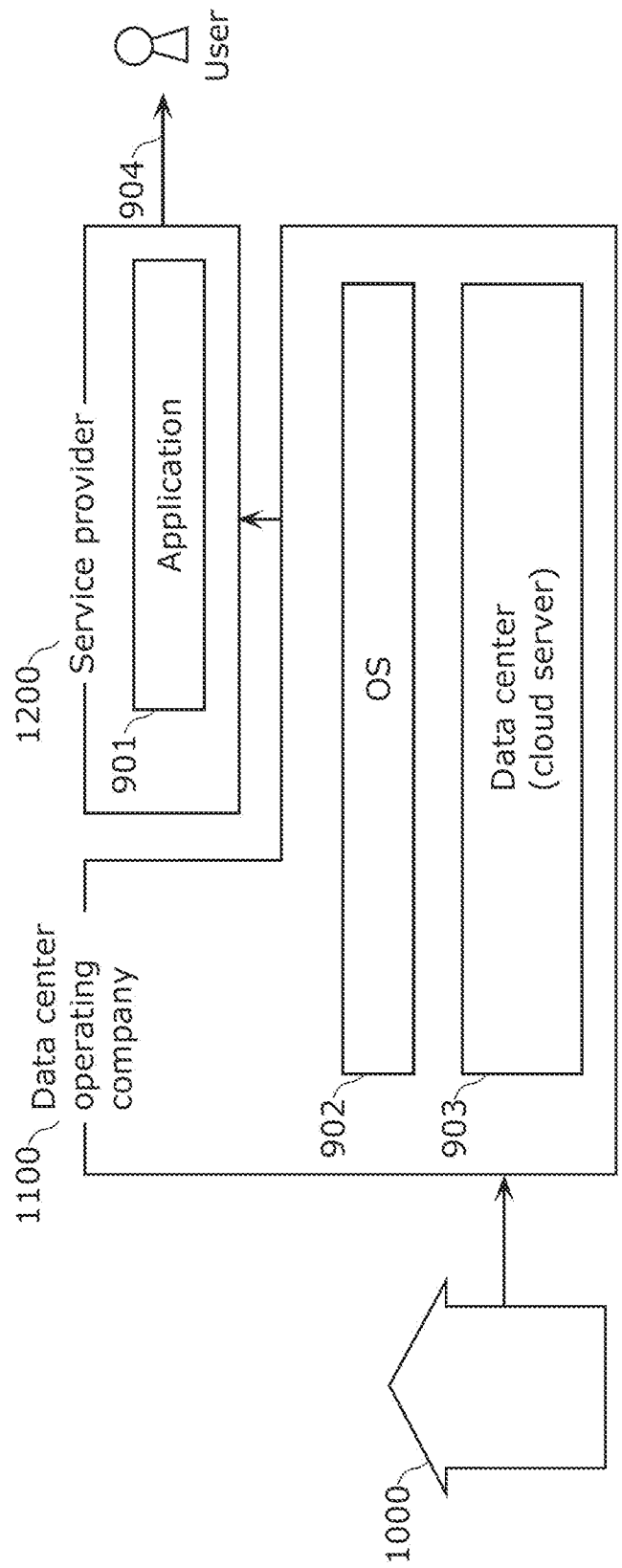
FIG. 35 illustrates service type 3 (PaaS use type) according to Embodiment 6.

With this type, data center operating company 1100 operates and manages data center 903 (cloud server 1110). Additionally, service provider 1200 manages OS 902 and application 901. Service provider 1200 provides service 904 using OS 902 and application 901 managed by service provider 1200.
Service Type 3: PaaS Use Type FIG. 35 illustrates service type 3 (PaaS use type). Here, "PaaS" is an acronym of "Platform as a Service", and is a cloud service delivery model that provides a platform for building and operating software as a service over the Internet.

Figure 36:
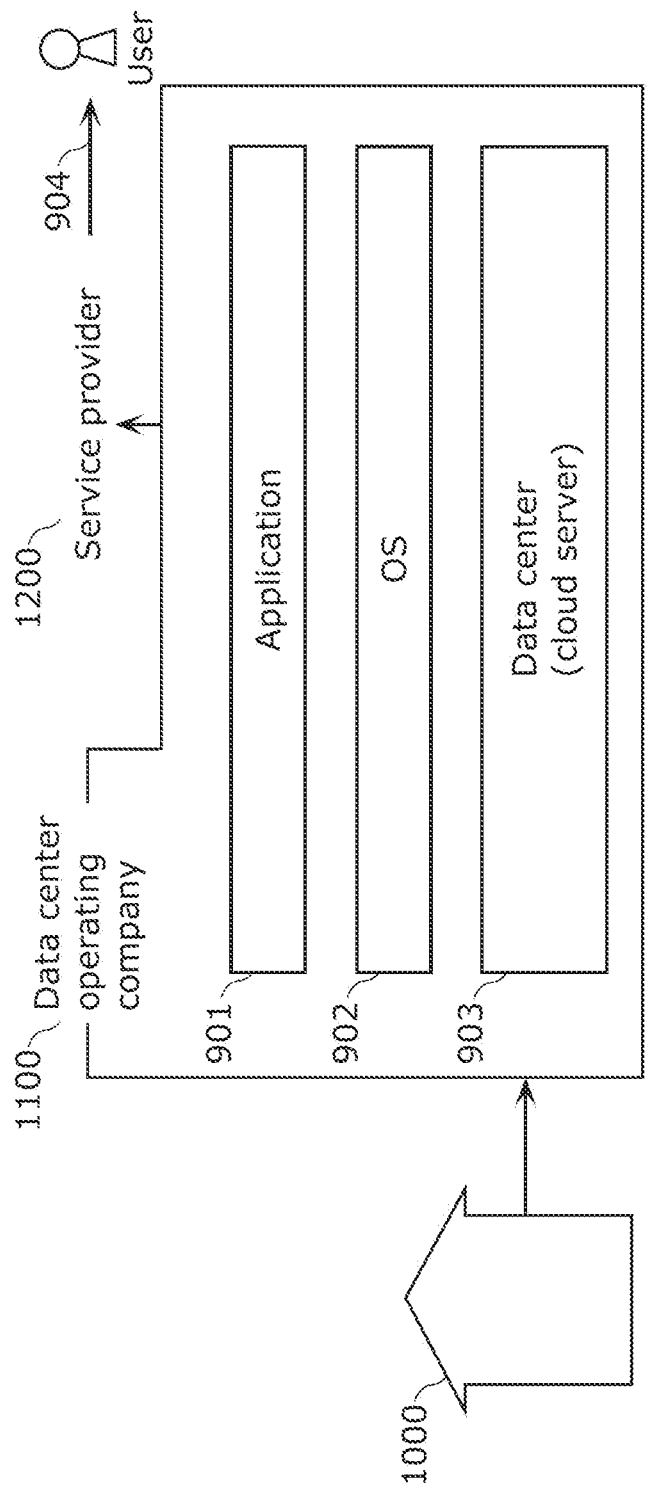
FIG. 36 illustrates service type 4 (SaaS use type) according to Embodiment 6.

With this type, data center operating company 1100 manages OS 902, and operates and manages data center 903 (cloud server 1110). Additionally, service provider 1200 manages application 901. Service provider 1200 provides service 904 using OS 902 managed by the data center operating company and application 901 managed by service provider 1200.
Service Type 4: SaaS Use Type FIG. 36 illustrates service type 4 (SaaS use type). Here, "SaaS" is an acronym of "Software as a Service". This is a cloud service delivery model that, for example, enables companies and individuals (users) who do not own a data center (cloud server) to use applications provided by a platform provider that owns a data center (cloud server) over a network such as the Internet.

With this type, data center operating company 1100 manages application 901, manages OS 902, and operates and manages data center 903 (cloud server 1110). Additionally, service provider 1200 provides service 904 using OS 902 and application 901 managed by data center operating company 1100.

In all of the foregoing types, service provider 1200 provides the service. Additionally, for example, the service provider or data center operating company may develop the OS, application, database of big data, or the like themselves, or may outsource such development to a third party.

OTHER EMBODIMENTS

Although a control device for a notification system according to one or more aspects of the present disclosure has been described thus far based on embodiments, the present disclosure is not intended to be limited to these embodiments. Variations on the present embodiment conceived by one skilled in the art, embodiments implemented by combining constituent elements from different other embodiments, and the like may be included in the scope of one or more aspects of the present disclosure as well, as long as they do not depart from the essential spirit of the present disclosure.

For example, instead of such a control device for a notification system, one aspect of the present disclosure may be a control method for a notification system taking the processing performed by the processors included in the control device for a notification system as steps. Additionally, aspects of the present disclosure may be realized as a computer program that causes a computer to execute the characteristic steps included in such a control method for a notification system. Furthermore, aspects of the present disclosure may be realized as a computer-readable non-transitory recording medium in which such a computer program is recorded.

Such a program causes a computer to: detect a visitor to the facility based on detection information from a first sensor; obtain a current relationship between a first user and a second user present in the facility; when a visitor to the first user is detected in the facility, notify the second user of a visit by the visitor by using the notification device based on the current relationship; and when the current relationship indicates that the first user has an event planned for the second user, skip notifying the second user of the visit by the visitor by using the notification device.

In the present disclosure, some or all of the units and devices, or some or all of the function blocks in the block diagrams in FIGS. 2 and 14, may be implemented by one or more electronic circuits, including semiconductor devices, semiconductor integrated circuits (ICs), or large scale integration (LSI) circuits. The LSI circuits or ICs may be integrated into a single chip, or may be constituted by a plurality of chips. For example, the function blocks aside from storage devices may be integrated into a single chip. Although the terms LSI and IC are used here, the terminology differs depending on the degree of integration, and may therefore be called system LSI, VLSI (Very Large Scale Integration), or ULSI (Ultra Large Scale Integration). Field programmable gate arrays (FPGAs), which are programmed after the LSI circuit is manufactured, or reconfigurable logic devices, which can reconfigure the junction relationships inside the LSI circuit or set up circuit compartments inside the LSI circuit, can be used for the same purpose.

Furthermore, some or all of the functions or operations of the units, devices, or some of the devices can be executed by software processing. In this case, the software is recorded on one or more non-transitory storage media such as ROM, optical disks, hard disk drives, or the like, and when executed by a processing device (a processor), the software causes the processing device (the processor) and peripheral devices to perform specific functions in the software. The system or device may include one or more non-transitory storage media on which the software is recorded, a processing device (a processor), and necessary hardware devices, such as interfaces.

INDUSTRIAL APPLICABILITY

The present disclosure can be used in a notification system that notifies a user of delivery information when a deliveryperson delivering an item arrives at a facility.

The invention claimed is:

1. A control method for a notification system including a notification device located in a facility, the control method comprising:
   detecting a visitor to the facility based on detection information from a first sensor, the visitor being a visitor for a first user present in the facility;
   obtaining a current relationship between the first user and a second user present in the facility; and
   when the visitor is detected in the facility, (i) determining, based on the current relationship between the first user and the second user, whether to notify the second user of a visit by the visitor for the first user and (ii) when it is determined to notify the second user of the visit by the visitor, notifying the second user of the visit by the visitor for the first user by using the notification device,
   wherein in the determining, when the current relationship between the first user and the second user indicates that the first user has an event planned for the second user, the determining determines to skip notifying the second user of the visit by the visitor for the first user by using the notification device.

2. The control method according to claim 1,
   wherein in the determining, when the current relationship between the first user and second user indicates a poor state, the determining determines to skip notifying the second user of the visit by the visitor for the first user by using the notification device.

3. The control method according to claim 1,
   wherein the facility includes a plurality of spaces demarked from each other,
   the second user is present in one of the plurality of spaces, and
   the control method further comprises:
   when a third user is present in a same space as the second user among the plurality of spaces, skipping notifying the third user of the visit by the visitor by using the notification device; and
   when the third user is present in a different space from the second user among the plurality of spaces, notifying the third user of the visit by the visitor by using the notification device.

4. The control method according to claim 1,
   wherein a third user is present in the facility, and
   the control method further comprises:
   obtaining information about whether the first user can receive the visitor based on detection information from a second sensor;
   obtaining a priority order indicating priority levels of relationships among the first user, the second user, and the third user as the current relationship when the first user cannot receive the visitor; and
   notifying the first user, the second user, and the third user of the visitor to the facility by using the notification device according to the priority levels.

5. The control method according to claim 4,
   wherein the visitor is a deliveryperson delivering an item to the facility, and
   the notifying of the visit by the visitor includes a notification of the visit by the deliveryperson and image information pertaining to the item using the notification device.

6. A control device comprising:
   circuitry; and
   a non-transitory memory,
   wherein the circuitry, in operation:
   detects a visitor to a facility based on detection information from a first sensor, the visitor being a visitor for a first user present in the facility;
   obtains a current relationship between the first user and a second user present in the facility from the memory; and
   when the visitor for the first user is detected in the facility, (i) determines, based on the current relationship between the first user and the second user, whether to notify the second user of a visit by the visitor for the first user and (ii) when it is determined to notify the second user of the visit by the visitor for the first user, notifies the second user of the visit by the visitor for the first user;
   wherein when the current relationship indicates that the first user has an event planned for the second user, the circuitry determines to skip notifying the second user of the visit by the visitor for the first user.

* * * * *